United States Patent
Mukherjee et al.

(10) Patent No.: US 12,283,997 B1
(45) Date of Patent: Apr. 22, 2025

(54) RECONFIGURABLE OPTICAL RECEIVER FOR USE WITH MULTIPLE MODULATION TECHNIQUES

(71) Applicant: Marvell Asia Pte Ltd, Singapore (SG)

(72) Inventors: Tonmoy Shankar Mukherjee, Camarillo, CA (US); Gary Mak, Santa Clara, CA (US); Masaki Kato, Palo Alto, CA (US); Lenin Kumar Patra, Dublin, CA (US); Radhakrishnan Nagarajan, Santa Clara, CA (US)

(73) Assignee: Marvell Asia Pte Ltd, Singapore (SG)

( * ) Notice: Subject to any disclaimer, the term of this patent is extended or adjusted under 35 U.S.C. 154(b) by 190 days.

(21) Appl. No.: 18/133,472

(22) Filed: Apr. 11, 2023

Related U.S. Application Data

(60) Provisional application No. 63/329,513, filed on Apr. 11, 2022.

(51) Int. Cl.
    *H04B 10/61* (2013.01)
    *H04B 10/69* (2013.01)

(52) U.S. Cl.
    CPC ......... *H04B 10/693* (2013.01); *H04B 10/615* (2013.01); *H04B 10/6161* (2013.01)

(58) Field of Classification Search
    CPC .......................................... H04B 10/60–6973
    See application file for complete search history.

(56) References Cited

U.S. PATENT DOCUMENTS

| | | | |
|---|---|---|---|
| 8,073,345 B2 | 12/2011 | Chen | |
| 8,971,677 B2* | 3/2015 | Sakamaki | G02B 6/12007 385/31 |
| 10,715,258 B1* | 7/2020 | Melikyan | H04J 14/06 |
| 10,763,968 B1 | 9/2020 | Li | |
| 11,333,831 B2 | 5/2022 | Dong | |
| 2009/0060511 A1 | 3/2009 | Toyoshima et al. | |
| 2012/0087661 A1 | 4/2012 | Look | |
| 2016/0380698 A1 | 12/2016 | Elahmadi et al. | |

(Continued)

OTHER PUBLICATIONS

Corsini et al., "90 Degree Hybrid Coupler," Major Qualifying Project submission, Worcester Polytechnic Institute, 127 pages (2013).

(Continued)

*Primary Examiner* — Nathan M Cors

(57) ABSTRACT

In an optical receiver apparatus for use with multiple optical modulation techniques, a photodiode circuit is configured to process optical signals corresponding to multiple optical modulation techniques, including a first modulation technique and a second modulation technique different from the first modulation technique. The photodiode circuit includes: a first photodiode configured to receive a first optical signal corresponding to a first modulation technique, and a multiple-input second photodiode coupled in series with the first photodiode. The multiple-input second photodiode is configured to receive i) a second optical signal corresponding to the first modulation technique, and ii) a third optical signal corresponding to the second modulation technique. An input of a transimpedance amplifier is coupled to the first photodiode and the second photodiode via a node between the first photodiode and the second photodiode.

21 Claims, 14 Drawing Sheets

(56) References Cited

U.S. PATENT DOCUMENTS

2017/0078028 A1* 3/2017 Zhang .............. H04B 10/0795
2019/0181960 A1* 6/2019 Wu .................... H04B 10/612

OTHER PUBLICATIONS

Kikuchi, "Fundamentals of Coherent Optical Fiber Communications," J. Lightwave Tech., vol. 34, No. 1, pp. 157-179 (2016).

Schaefer et al., "Comparison of Homodyne and Intradyne Detection for High-Order Modulation Schemes in Optical Intersatellite Communication Systems," 2015 IEEE Int'l Conf. Space Optical Systems and Applications (ICSOS), Oct. 26-28, 2015, 5 pages (2015).

Yin et al., "DLI-Based DP-QPSK Reception Scheme for Short-Range Optical Communication," Appl. Sci. 2020, No. 14, p. 4815 (2020).

"Technical note—Si photodiodes," Hamamatsu Photonics K.K., 18 pages (May 2022).

* cited by examiner

RECONFIGURABLE OPTICAL RECEIVER FOR USE WITH MULTIPLE MODULATION TECHNIQUES

CROSS REFERENCES TO RELATED APPLICATIONS

This application claims the benefit of U.S. Provisional Patent App. No. 63/329,513, entitled "Multi-Modulation-Format Rx Chip Reconfigurable Multi-Modulation Format Rx," filed on Apr. 11, 2022, the disclosure of which is expressly incorporated herein by reference in its entirety.

FIELD OF TECHNOLOGY

This disclosure relates generally to optical communications, and more particularly to optical receivers.

BACKGROUND

During this time of growth of Internet technologies and usage, demand for high speed data transmission has increased rapidly. As an example, average internet traffic in 2021 was estimated to exceed 700 terabytes per second. Technologies to support such sustained usage levels will continue to proliferate. Optical transmission of data can support vast amounts of data per channel-often limited more by the rate at which electronics can encode a signal onto the optical channel rather than the bandwidth of the channel itself. Improvements to optical modulation performance will continue to drive adoption of such technologies.

There are a number of different modulation techniques currently in use for optical communications. Examples of such modulation techniques include intensity-modulation, direct detection (IMDD), dual polarization IMDD, quadrature phase shift keying (QPSK) modulation, dual polarization QPSK (DP-QPSK) modulation, differential QPSK (DQPSK) modulation, dual polarization DQPSK, intradyne M-QAM, dual polarization M-QAM, etc. A typical optical receiver is capable of demodulating only one type of optical modulation (or a small subset of the various currently available types of optical modulation). For example, a typical optical receiver capable of demodulating IMDD signals is not capable of performing coherent or intradyne optical demodulation techniques. As another example, a typical optical receiver capable of performing coherent or intradyne optical demodulation is not capable of processing IMDD modulation.

SUMMARY

In an embodiment, an optical receiver apparatus is for use with multiple optical modulation techniques. The optical receiver apparatus is configured to convert one or more optical signals to an electrical signal. The optical receiver apparatus comprises: a photodiode circuit that is configured to process optical signals corresponding to multiple optical modulation techniques, including a first modulation technique and a second modulation technique different from the first modulation technique. The photodiode circuit includes: a first photodiode configured to receive a first optical signal corresponding to a first modulation technique, and a multiple-input second photodiode coupled in series with the first photodiode, the multiple-input second photodiode being configured to receive i) a second optical signal corresponding to the first modulation technique, and ii) a third optical signal corresponding to the second modulation technique. The optical receiver apparatus further comprises a transimpedance amplifier having an input coupled to the first photodiode and the second photodiode via a node between the first photodiode and the second photodiode, the transimpedance amplifier being configured to generate the electrical signal.

In another embodiment, an optical receiver for use with multiple optical modulation techniques comprises: a plurality of photodiode circuits, each of at least one of the photodiode circuits being configured to process optical signals corresponding to multiple optical modulation techniques, including a first modulation technique and a second modulation technique different from the first modulation technique. Each of at least one of the photodiode circuits includes: a first photodiode configured to receive a first optical signal corresponding to a first modulation technique; a multiple-input second photodiode coupled in series with the first photodiode, the multiple-input second photodiode being configured to receive i) a second optical signal corresponding to the first modulation technique, and ii) a third optical signal corresponding to the second modulation technique; and a node between the first photodiode and the second photodiode. The optical receiver further comprises: a plurality of transimpedance amplifiers coupled to nodes of the plurality of photodiode circuits, each of at least some of transimpedance amplifiers having an input coupled to a respective node between the first photodiode and the multiple-input second photodiode of a respective photodiode circuit, a plurality of analog-to-digital converters (ADCs) coupled to outputs of the plurality of transimpedance amplifiers; and a digital signal processor (DSP) coupled to outputs of the plurality of ADCs, the DSP configured to process outputs of the ADCs to decode bits modulated on optical signals received by the optical receiver.

In yet another embodiment, a method of operating a reconfigurable optical receiver includes: determining, at the reconfigurable optical receiver, a type of modulation that the reconfigurable optical receiver is to process, the type of modulation being determined from a plurality of different types of optical modulation techniques, including at least a first type and a second type; and in response to determining that the type of modulation that the reconfigurable optical receiver is to process is the first type: controlling an optical switch of the reconfigurable optical receiver so that an optical signal corresponding to a signal received by the reconfigurable optical receiver bypasses an optical processor of the reconfigurable optical receiver, and providing the optical signal that bypasses the optical processor to a multiple-input photodiode of a photodiode circuit of the reconfigurable optical receiver. The method also includes: in response to determining that the type of modulation that the reconfigurable optical receiver is to process is the second type: controlling an optical switch of the reconfigurable optical receiver so that the optical signal corresponding to the signal received by the reconfigurable optical receiver is provided to an input of the optical processor of the reconfigurable optical receiver, and providing multiple outputs of the optical processor to the photodiode circuit of the reconfigurable optical receiver, including providing a first output of the optical processor to the multiple-input photodiode. The method further includes: using a transimpedance amplifier of the reconfigurable optical receiver to convert a current signal output by the photodiode circuit to a voltage signal; sampling, by an ADC of the reconfigurable optical receiver, the voltage signal to generate a digital domain signal; and processing, by a DSP of the reconfigurable optical receiver, the digital domain signal to recover information bits from the digital domain signal.

DETAILED DESCRIPTION

As discussed above, typical optical receivers are capable of demodulating only one type of optical modulation (or a small subset of the various currently available types of optical modulation). For example, a typical optical receiver capable of demodulating IMDD signals is not capable of performing coherent or intradyne optical demodulation techniques. As another example, a typical optical receiver capable of performing coherent or intradyne optical demodulation is not capable of processing IMDD modulation.

In embodiments described below, a reconfigurable optical receiver is capable of demodulating optical signals that are modulated according to various optical modulation techniques. As an illustrative example, an optical receiver is capable of demodulating IMDD-modulated signals, and can be reconfigured to perform heterodyne or intradyne optical demodulation, according to some embodiments.

The reconfigurable optical receiver utilizes an innovative optical-to-electrical conversion circuit that is capable of processing optical signals that are modulated according to various optical modulation techniques, according to some embodiments. For example, the optical-to-electrical conversion circuit is capable of processing IMDD-modulated signals as well as coherent- or intradyne-modulated signals, according to some embodiments. On the other hand, typical optical receivers use either a first optical-to-electrical conversion circuit configured for processing IMDD-modulated signals or a second optical-to-electrical conversion circuit configured for processing coherent- or intradyne-modulated signals, i.e., where the first optical-to-electrical conversion circuit is different than the second optical-to-electrical conversion circuit.

Figure 1A:
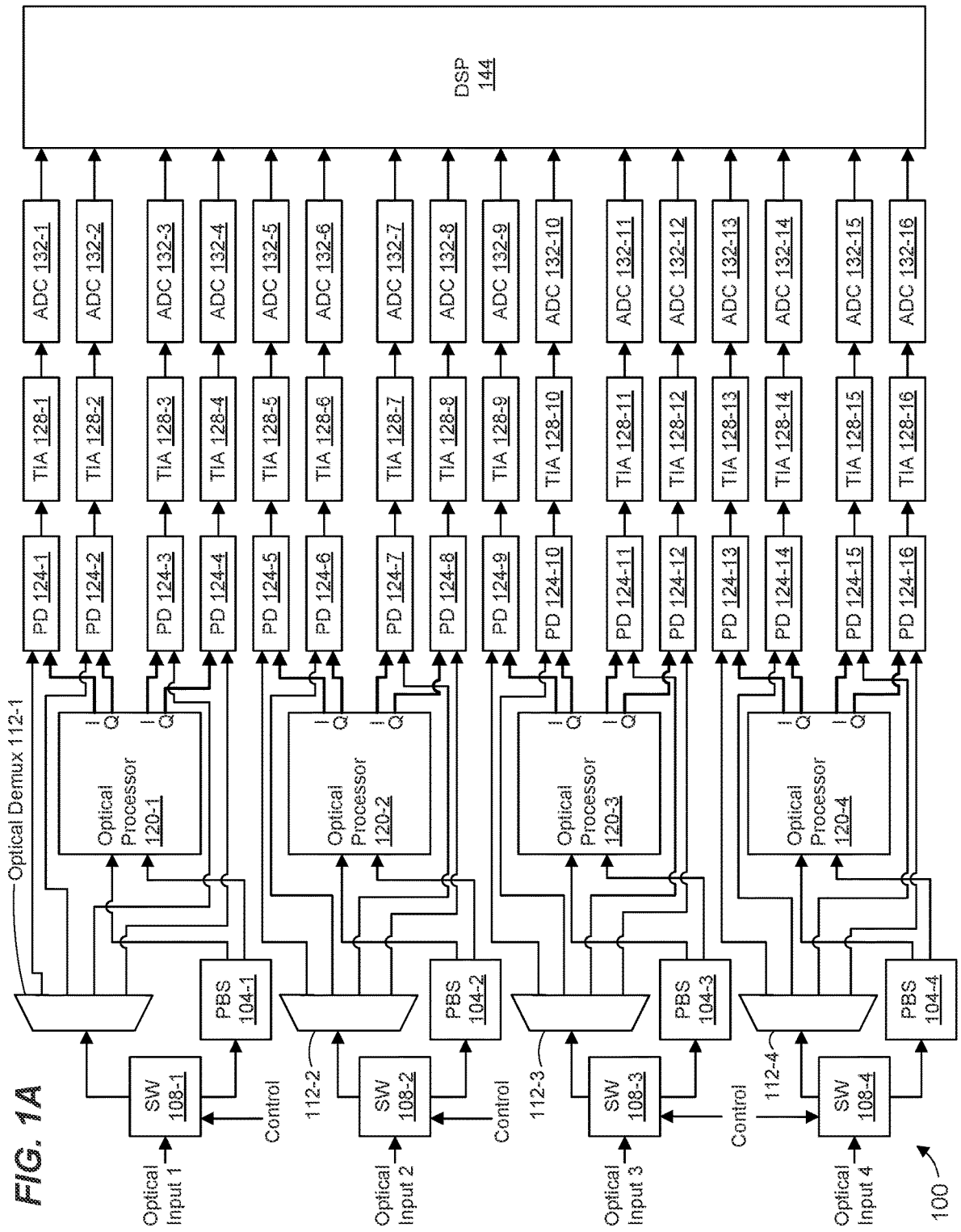
FIG. 1A is a simplified block diagram of an example reconfigurable optical receiver that is capable of demodulating optical signals that are modulated according to different optical modulation techniques, according to an embodiment.

FIG. 1A is a simplified block diagram of an example reconfigurable optical receiver 100 that is capable of demodulating optical signals that are modulated according to different optical modulation techniques, according to an embodiment. For instance, when the optical receiver 100 is in a first configuration, the optical receiver 100 is configured to receive and demodulate up to four IMDD-modulated signals (or multiple IMDD-modulated signals if multiplexed on multiple wavelengths). When the optical receiver 100 is in a second configuration, the optical receiver 100 is configured to receive and demodulate up to four optical signals modulated using a different type of modulation such as QPSK modulation, dual polarization QPSK modulation, DQPSK modulation, dual polarization DQPSK, intradyne M-QAM modulation, dual polarization intradyne M-QAM modulation, etc. The optical receiver 100 is configured to receive up to four optical signals via a first optical input (optical input 1), a second optical input (optical input 2), a third optical input (optical input 3), and a fourth optical input (optical input 4). The optical inputs are configured to receive optical signals from one or more suitable source(s), such as up to four fiber optic cables, in an embodiment. The optical inputs are optically coupled to respective optical ports (not shown) of or corresponding to the reconfigurable optical receiver 100, in an embodiment.

A plurality of polarity beam splitters (PBSs) 104 are respectively coupled to the optical inputs via respective optical switches 108. Each PBS 104 is configured to receive an input optical signal from a corresponding optical input and split the input optical signal into a first output optical signal and a second output optical signal. The first output optical signal corresponds to light in the input signal that is polarized in a first direction, and the second output signal corresponds to light in the input optical signal that is polarized in a second direction different from the first direction.

Each optical switch 108 includes a first output that is coupled to an input of the respective PBS 104, and the PBS 104 therefore receives a respective optical input via the first output of the optical switch 108. A second output of each optical switch 108 is coupled to a respective optical demultiplexer 112. Each optical switch 108 is configured to selectively couple the respective optical input 1 to either the respective PBS 104 or the respective optical demultiplexer 112 based on a control signal. In the first configuration of the optical receiver 100 (e.g., when IMDD-modulated signals (or multiple IMDD-modulated signals if multiplexed on multiple wavelengths) are received via the optical inputs), the control signal controls each optical switch 108 to optically couple the respective optical input to an input of the respective optical demultiplexer 112. In the second configuration of the optical receiver 100 (e.g., when optical inputs corresponds to QPSK modulation, dual polarization QPSK modulation, DQPSK modulation, dual polarization DQPSK, intradyne M-QAM, dual polarization intradyne M-QAM, etc.), the control signal controls each optical switch 108 to optically couple the respective optical input to the input of the respective PBS 104.

In an embodiment, the optical receiver 100 comprises a controller (not shown) that generates the control signal. In an embodiment, the controller comprises a processor configured to execute machine-readable instructions stored in a memory coupled to the processor. In another embodiment, the controller comprises a hardware circuitry (e.g., a hardware state machine).

The outputs of each PBS 104 are coupled to a corresponding optical processor 120. Each optical processor 120 is configured to generate four pairs of outputs based on optical signals received from a corresponding PBS 104. Each optical processor 120 comprises a plurality of optical couplers (e.g., 3 decibel (3 db) optical couplers) and one or more optical phase shifters. In some embodiments, each optical processor 120 comprises one or more optical delay lines. In some embodiments, each optical processor 120 is configured to optically mix received optical signals with a local optical oscillator. In some embodiments, each optical processor 120 is configured to optically mix a received optical signal with a delayed version of the optical signal.

Generally, the type of optical processor 120 depends on the type of optical modulation to be used and/or an amount of optical demodulation processing to be performed by the optical processor 120 versus an amount of demodulation processing to be performed by a digital signal processor (DSP) of the optical receiver 100. In some embodiments, each optical processor 120 comprises coherent intradyne dual polarization (2-Pol) 90-degree hybrid device. In other embodiments, each optical processor 120 comprises one or more delay line interferometers (DLIs). In some embodiments, each optical processor 120 comprises one or more Mach-Zehnder interferometers (MZIs).

In some embodiments in which each optical processor 120 corresponds to a coherent intradyne dual polarization (2-Pol) 90-degree hybrid device, the outputs of each PBS 104 are coupled to a corresponding coherent intradyne 2-Pol 90-degree hybrid device 120. Each coherent intradyne 2-Pol 90-degree hybrid device 120 is configured to optically mix the optical signals received from a corresponding PBS 104 with a local optical oscillator (not shown), and to generate four pairs of outputs based on optical signals received from a corresponding PBS 104. For instance, the coherent intradyne 2-Pol 90-degree hybrid device 120 is configured to generate a pair of in-phase (I) signals and pair of quadrature (Q) signals based on each output of the PBS 104. In some embodiments involving M-QAM or DQPSK demodulation, for example, the powers of signals output by the coherent intradyne 2-Pol 90-degree hybrid device 120 can be represented as:

$$P_{I,1}(t) = \tfrac{1}{4}|A(t)||A_{LO}|\cos(\omega_{if}t + \theta_{if}) \qquad \text{(Equation 1)}$$

$$P_{I,2}(t) = -\tfrac{1}{4}|A(t)||A_{LO}|\cos(\omega_{if}t + \theta_{if}) \qquad \text{(Equation 2)}$$

$$P_{Q,1}(t) = \tfrac{1}{4}|A(t)||A_{LO}|\sin(\omega_{if}t + \theta_{if}) \qquad \text{(Equation 3)}$$

$$P_{Q,2}(t) = -\tfrac{1}{4}|A(t)||A_{LO}|\sin(\omega_{if}t + \theta_{if}) \qquad \text{(Equation 4)}$$

where $P_{I,1}(t)$ is the optical power of a first I signal, $P_{I,2}(t)$ is the optical power of a second I signal, $P_{Q,1}(t)$ is the optical power of a first Q signal, $P_{Q,2}(t)$ is the optical power of a second Q signal, $A(t)$ is the signal electric field from the PBS 104, $A_{LO}(t)$ is a local oscillator laser electric field. $\omega_{if}$ and $\theta_{if}$ is the frequency and phase difference between A and $A_{LO}$, respectively.

In some embodiments in which each optical processor 120 corresponds to one or more DLIs, the outputs of each PBS 104 are coupled to a corresponding set of one or more DLIs 120. Each set of one or more DLIs 120 is configured to generate four pairs of outputs based on optical signals received from a corresponding PBS 104. For instance, the DLI 120 is configured to generate a pair of I signals and pair of Q signals based on each output of the PBS 104. In an embodiment involving DQPSK demodulation, the powers of signals output by the DLI 120 can be represented as.

$$P_{I,1}(t) = \tfrac{1}{4}|A(t) + A(t - T_s)|^2 \qquad \text{(Equation 5)}$$

$$P_{I,2}(t) = \tfrac{1}{4}|A(t) - A(t - T_s)|^2 \qquad \text{(Equation 6)}$$

$$P_{Q,1}(t) = \tfrac{1}{4}|A(t) + A(t - T_s)|^2 \qquad \text{(Equation 7)}$$

$$P_{Q,2}(t) = \tfrac{1}{4}|A(t) + A(t - T_s)|^2 \qquad \text{(Equation 8)}$$

where $P_{I,1}(t)$ is the optical power of a first I signal, $P_{I,2}(t)$ is the optical power of a second I signal, $P_{Q,1}(t)$ is the optical power of a first Q signal, $P_{Q,2}(t)$ is the optical power of a second Q signal, $A(t)$ is the signal from the PBS 104, and $T_s$ is a symbol delay.

Outputs of each optical processor 120 are coupled to a plurality of optical-to-electrical conversion circuits, each optical-to-electrical conversion circuit comprising a photodiode circuit 124 coupled to a transimpedance amplifier (TIA) 128. As will be described further below, each photodiode circuit 124 is configured to convert one or more optical signals into a current signal, and the corresponding TIA 128 is configured to convert the current signal into a voltage signal, according to an embodiment.

The optical demultiplexer 112 is configured to demultiplex multiple optical signals at respective wavelengths from light received via optical input 1, the multiple optical signals having been multiplexed at a transmitter. The demultiplexed optical signals are output via respective outputs of the optical demultiplexer 112, which are optically coupled to the photodiode circuits 124-1, 124-5, 124-9, and 124-13, respectively. Thus, in the first configuration demultiplexed IMDD signals are provided to the photodiode circuits 124-1, 124-5, 124-9, and 124-13.

Each of at least some of the optical-to-electrical conversion circuits is configured to process optical signals that are modulated according to multiple different optical modulation techniques. As can be seen from FIG. 1A, each of the photodiode circuits 124 is optically coupled to both i) a respective output of a respective optical demultiplexer 112 and ii) respective outputs of a respective optical processor 120. As will be described further below, each of the photodiode circuits 124 includes a multiple-input photodiode that is configured to receive both i) a respective output of a respective optical demultiplexer 112 and ii) respective outputs of a respective optical processor 120.

As will be described further below, when the optical receiver 100 is in a first configuration, each of the photodiode circuits 124 receives a respective IMDD modulated signal from a respective optical demultiplexer 112; and when the optical receiver 100 is in a second configuration, each of the photodiode circuits 124 receives a set of optical signals from a respective optical processor 120.

When the optical receiver 100 is in the first configuration, each of the photodiode circuits 124 is configured to generate a current signal that corresponds to an IMDD modulated signal from the respective optical demultiplexer 112. When the optical receiver 100 is in the second configuration, each photodiode circuit 124 is configured to generate a current signal that corresponds to a subtraction of either i) a corresponding pair of I signals (e.g., Equations 1 and 2, or Equations 5 and 6), or ii) a corresponding pair of Q signals (e.g., Equations 3 and 4, or Equations 7 and 8), according to an embodiment.

Outputs of the TIAs 128 are provided to respective analog-to-digital converters (ADCs) 132. Each ADC 132 is configured to generate a digital-domain signal corresponding to the output of the respective TIA 128.

Outputs of the ADCs 132 are provided to a digital signal processor (DSP) 144. The DSP 144 is configured to process the digital domain signals output by the ADCs 132 to decode information bits from the digital domain signals. In various embodiments, the DSP 144 is also configured to perform one or more of i) filtering of the digital domain signals, ii) equalization of the digital domain signals, iii) error detection/correction of information bits decoded from the digital domain signals, etc.

The DSP 144 comprises one or more special purpose processors that each comprise a processor coupled to a memory, the processor configured to execute machine-readable instructions stored in the memory; when executed by the processor, the machine-readable instructions cause the processor to perform various suitable DSP processing operations on the digital domain signals from one or more ADCs 132, according to an embodiment. The DSP 144 comprises hardware circuitry that is configured to perform various suitable DSP processing operations on the digital domain signals from one or more ADCs 132, according to another embodiment. In another embodiment, the DSP 144 comprises a combination of i) one or more such processors that execute machine-readable instructions, and ii) hardware circuitry that together perform various suitable DSP processing operations on the digital domain signals from one or more ADCs 132.

Although the DSP 144 is illustrated in FIG. 1A as a single DSP, in some embodiments the DSP 144 comprises a plurality of individual DSPs that each process a respective set of one or more digital domain signals from one or more ADCs 132. As an illustrative example, the DSP 144 includes a first individual DSP that processes digital domain signals from ADCs 132-1, 132-2, 132-3, 132-4; a second individual DSP that processes digital domain signals from ADCs 132-5, 132-6, 132-7, 132-8; a third individual DSP that processes digital domain signals from ADCs 132-9, 132-10, 132-11, 132-12; and a fourth individual DSP that processes digital domain signals from ADCs 132-13, 132-14, 132-15, 132-16.

Although FIG. 1A illustrates the optical receiver 100 as receiving and processing four optical inputs, in other embodiments the optical receiver 100 includes components for receiving and processing another suitable number of optical inputs.

Although FIG. 1A illustrates optical demultiplexers 112 that are configured to demultiplex four multiplexed optical signals, in other embodiments the optical receiver 100 includes optical demultiplexers that are configured to demultiplex other suitable numbers of multiplexed optical signals.

Figure 1B:
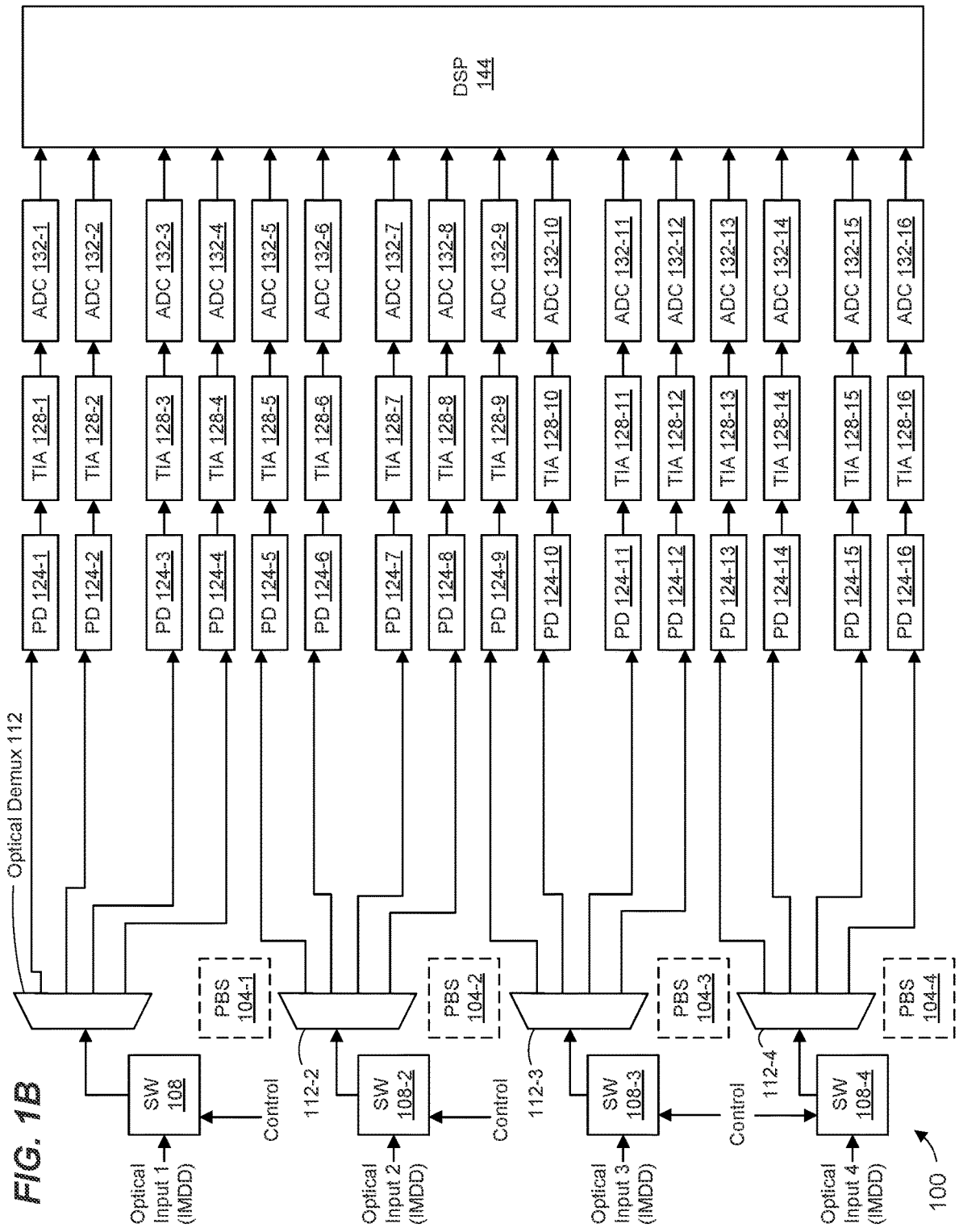
FIG. 1B is an illustration of the optical receiver of FIG. 1A in a first configuration in which the optical receiver is configured to receive and demodulate signals modulated according to a first modulation technique, according to an embodiment.

As discussed above, the optical receiver 100 is reconfigurable to demodulate optical signals that are modulated according to different optical modulation techniques. FIG. 1B is an illustration of the optical receiver 100 in a first configuration in which the optical receiver 100 is configured to receive and demodulate multiple IMDD-modulated signals multiplexed on multiple wavelengths, according to an embodiment. The IMDD-modulated signals multiplexed on multiple wavelengths are received via the optical inputs (e.g., optical input 1, optical input 2, optical input 3, optical input 4).

In the first configuration, the control signal provided to the optical switches 108 controls the optical switch 108 to direct optical signals received via the optical inputs to the optical demultiplexers 112. As a result, the PBSs 104 do not receive the optical signals. Thus, the PBSs 104 do not provide any optical signals to the optical processors 120 (FIG. 1A), and the optical processors 120 do not provide any optical signals to the photodiode circuits 124. Accordingly, the optical processors 120 are not illustrated in FIG. 1B to help show the paths of optical signals through the optical receiver 100 while in the first configuration.

Each optical demultiplexer 112 demultiplexes the optical signals received via the respective optical input into four outputs, which are provided to respective photodiode circuits 124.

Each of the photodiode circuits 124 generates a respective current signal that corresponds to an IMDD modulated signal from the respective optical demultiplexer 112. The TIAs 128 generate respective voltage signals based on the current signals from the photodiode circuits 124. The ADCs 132 convert the voltage signals from the TIAs 128-1 into respective digital domain signals, which are processed by the DSP 144 to recover information bits.

Figure 1C:
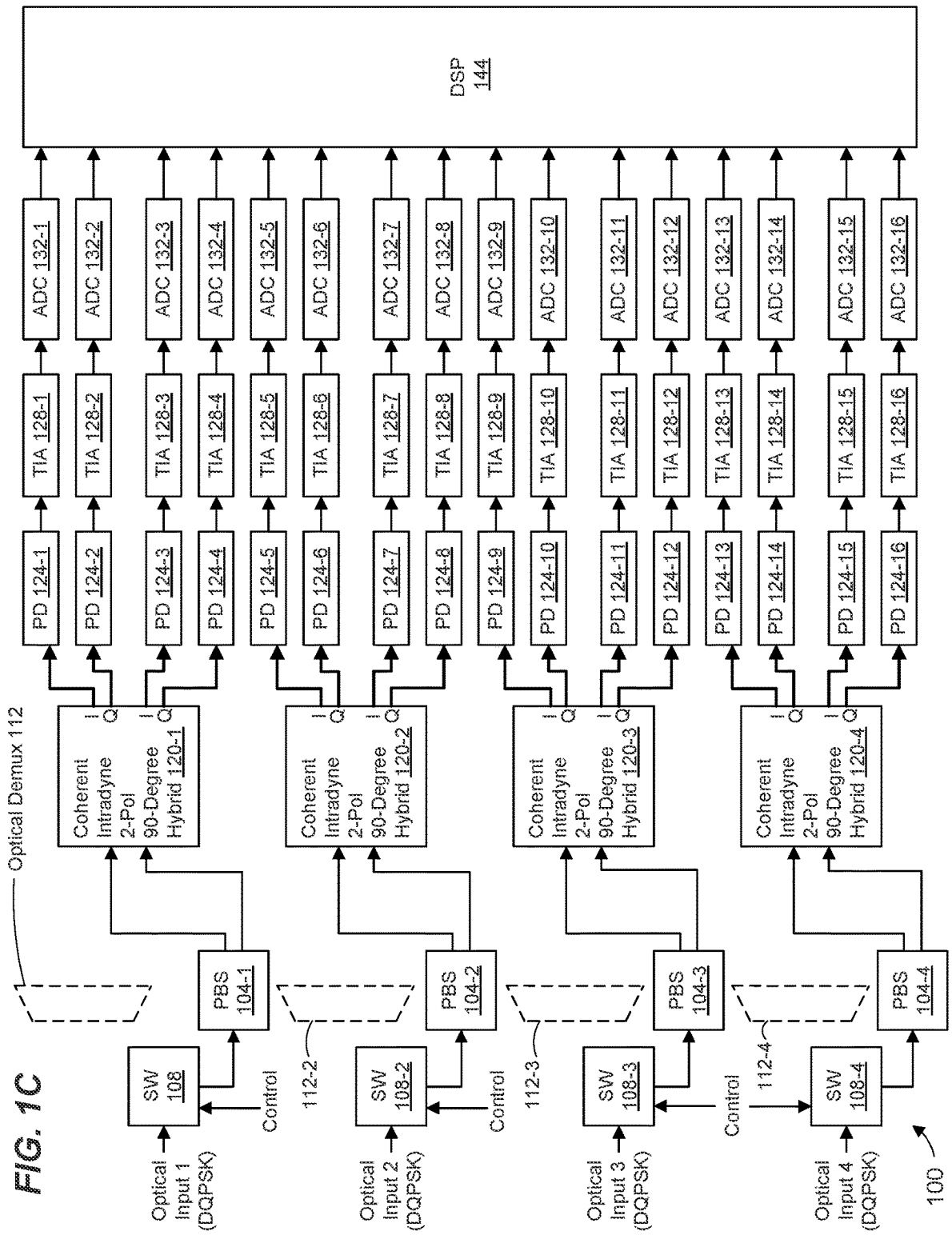
FIG. 1C is an illustration of the optical receiver of FIG. 1A in a second configuration in which the optical receiver is configured to receive and demodulate signals modulated according to a second modulation technique, according to an embodiment.

FIG. 1C is an illustration of the optical receiver 100 in a second configuration in which the optical receiver 100 is configured to receive and demodulate multiple DQPSK signals, according to an embodiment. In the embodiment of FIG. 1C, each optical processor 120 corresponds to a coherent intradyne 2-Pol 90-degree hybrid device 120. The DQPSK-modulated signals are received via optical input 1, optical input 2, optical input 3, and optical input 4.

In the second configuration, the control signal provided to the optical switch 108 controls the optical switch 108 to direct optical signals received via optical input 1 to the PBS 104-1. As a result, optical demultiplexer 112 does not receive the optical signals. Thus, the optical demultiplexer 112 does provide any optical signals to the photodiode circuits 124-1, 124-5, 124-9, and 124-13. Accordingly, the lines from the optical demultiplexer 112 to the photodiode circuits 124-1, 124-5, 124-9, and 124-13 are not illustrated in FIG. 1C to help show the paths of optical signals through the optical receiver 100 while in the second configuration.

Each PBS 104 splits a corresponding input optical signal into a first output optical signal (corresponding to light polarized in a first direction) and a second output optical signal (corresponding to light polarized in a second direction). Each coherent intradyne 2-Pol 90-degree hybrid device 120 receives the first optical signal and the second optical signal from the corresponding PBS 104. The coherent intradyne 2-Pol 90-degree hybrid device 120 generates a pair of I signals and a pair of Q signals based on each output of the PBS 104, as discussed above.

Each photodiode circuit 124 receives a corresponding pair of I signals (e.g., Equations 1 and 2), or ii) a corresponding pair of Q signals (e.g., Equations 3 and 4) and generates a current signal that corresponds to a subtraction of i) the corresponding pair of I signals, or ii) the corresponding pair of Q signals.

The TIAs 128 generate respective voltage signals based on the current signals from the corresponding photodiode circuits 124, and outputs of the TIAs 128 are provided to respective ADCs 132. Each ADC 132 generates a digital-domain signal corresponding to the output of the respective TIA 128, and the DSP 144 processes the digital-domain signals to recover information bits.

Figure 1D:
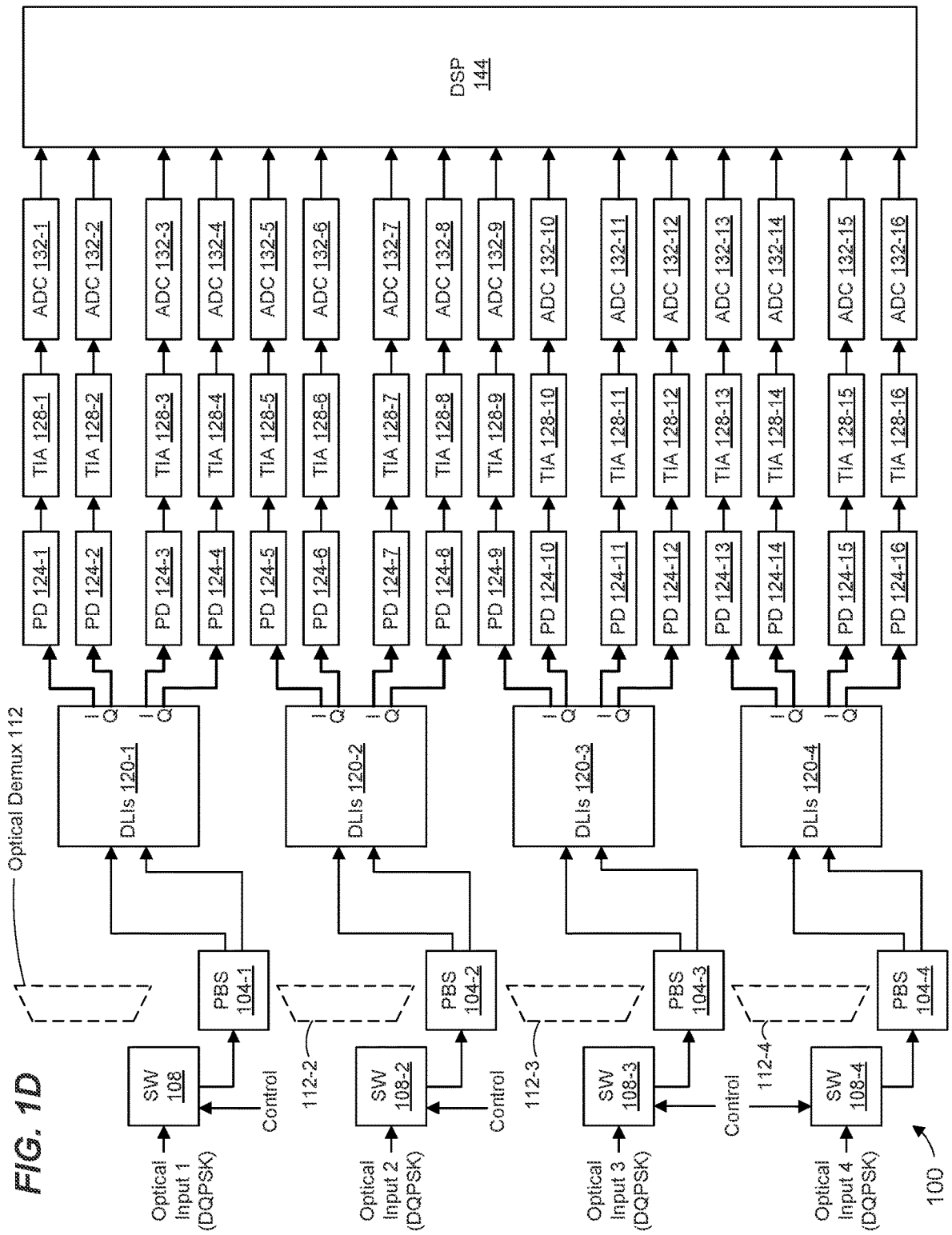
FIG. 1D is an illustration of the optical receiver of FIG. 1A in the second configuration in which the optical receiver is configured to receive and demodulate signals modulated according to the second modulation technique, according to another embodiment.

FIG. 1D is an illustration of the optical receiver 100 in the second configuration in which the optical receiver 100 is configured to receive and demodulate multiple DQPSK signals, according to another embodiment. In the embodiment of FIG. 1D, each optical processor 120 corresponds to a set of one or more DLIs.

In the embodiment of FIG. 1D, more of the demodulation processing is performed in the DLIs 120 (optical processors 120) and therefore less demodulation processing need be performed by the DSP 144 as compared to the embodiment of FIG. 1C. In an embodiment, a respective polarization controller (PC) is coupled between each optical switch 108 and the input of each PBS 104.

Figure 1E:
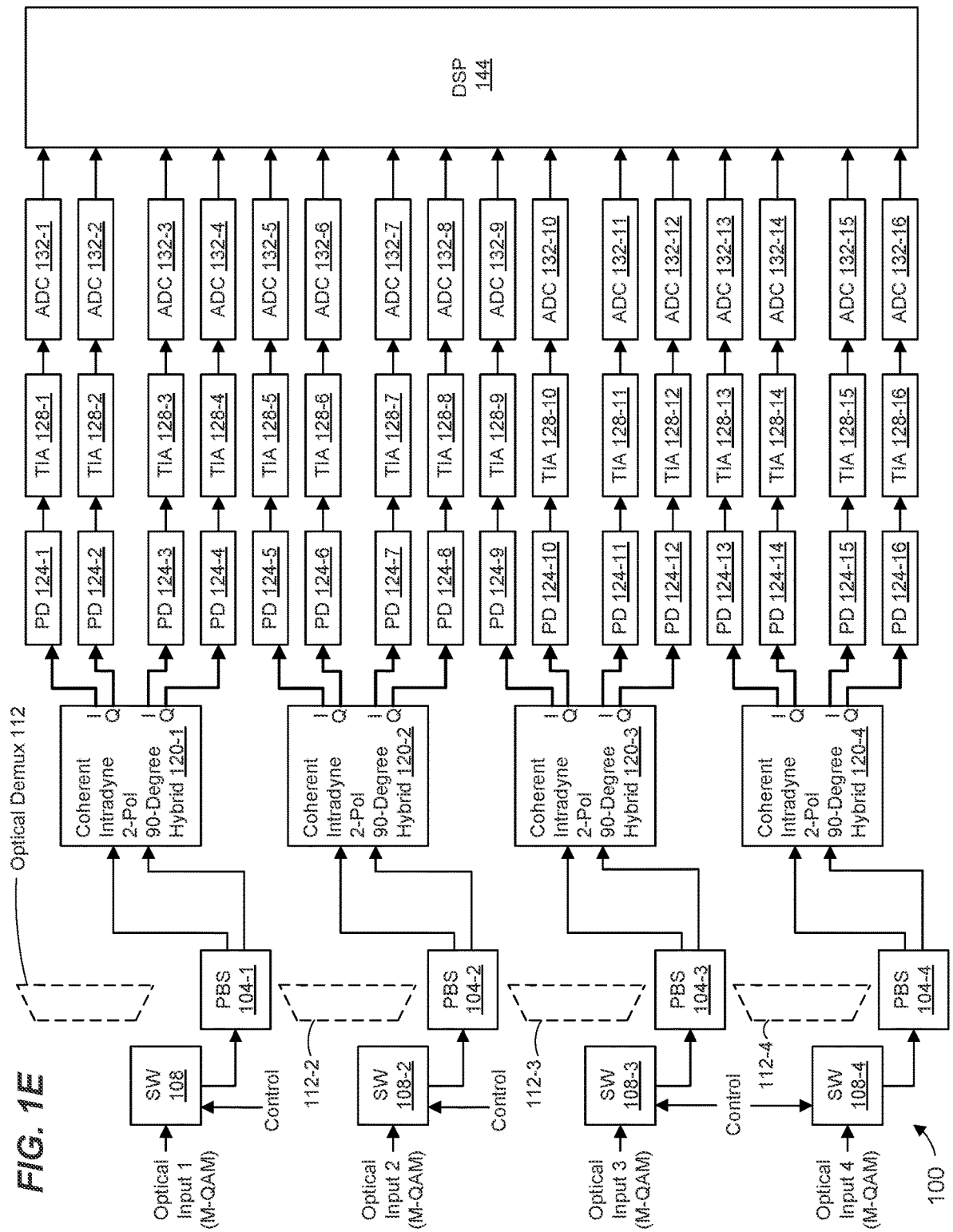
FIG. 1E is an illustration of the optical receiver of FIG. 1A in a third configuration in which the optical receiver is configured to receive and demodulate signals modulated according to a third modulation technique, according to an embodiment.

In addition to or instead of the first and second configurations described above, the optical receiver 100 can be configured to operate according to one or more other modulation schemes, according to some embodiments. For instance, FIG. 1E is an illustration of the optical receiver 100 in a third configuration in which the optical receiver 100 is configured to receive and demodulate multiple M-QAM intradyne-modulated signals, according to an embodiment. Similar to the embodiment of FIG. 1C, each optical processor 120 corresponds to a coherent intradyne 2-Pol 90-degree hybrid device 120. The M-QAM intradyne-modulated signals are received via optical input 1, optical input 2, optical input 3, and optical input 4.

In the third configuration, the control signal provided to the optical switches 108 controls the optical switches 108 to direct optical signals received via the optical inputs to the PBSs 104. As a result, the optical demultiplexers 112 do not receive the optical signals. Thus, the optical demultiplexers 112 do provide any optical signals to the photodiode circuits 124. Accordingly, the lines from the optical demultiplexers 112 to the photodiode circuits 124 are not illustrated in FIG. 1E to help show the paths of optical signals through the optical receiver 100 while in the third configuration.

Each PBS 104 splits a corresponding input optical signal into a first output optical signal (corresponding to light polarized in a first direction) and a second output optical signal (corresponding to light polarized in a second direction). Each coherent intradyne 2-Pol 90-degree hybrid device 120 receives the first optical signal and the second optical signal from the corresponding PBS 104. The coherent intradyne 2-Pol 90-degree hybrid device 120 generates a pair of I signals and pair of Q signals based on each output of the PBS 104, as discussed above.

Each photodiode circuit 124 receives a corresponding pair of I signals, or ii) a corresponding pair of Q signals and generates a current signal that corresponds to a subtraction of i) the corresponding pair of I signals, or ii) the corresponding pair of Q signals.

The TIAs 128 generate respective voltage signals based on the current signals from the corresponding photodiode circuits 124, and outputs of the TIAs 128 are provided to respective ADCs 132. Each ADC 132 generates a digital-domain signal corresponding to the output of the respective TIA 128, and the DSP 144 processes the digital-domain signals to recover information bits.

Figure 2A:
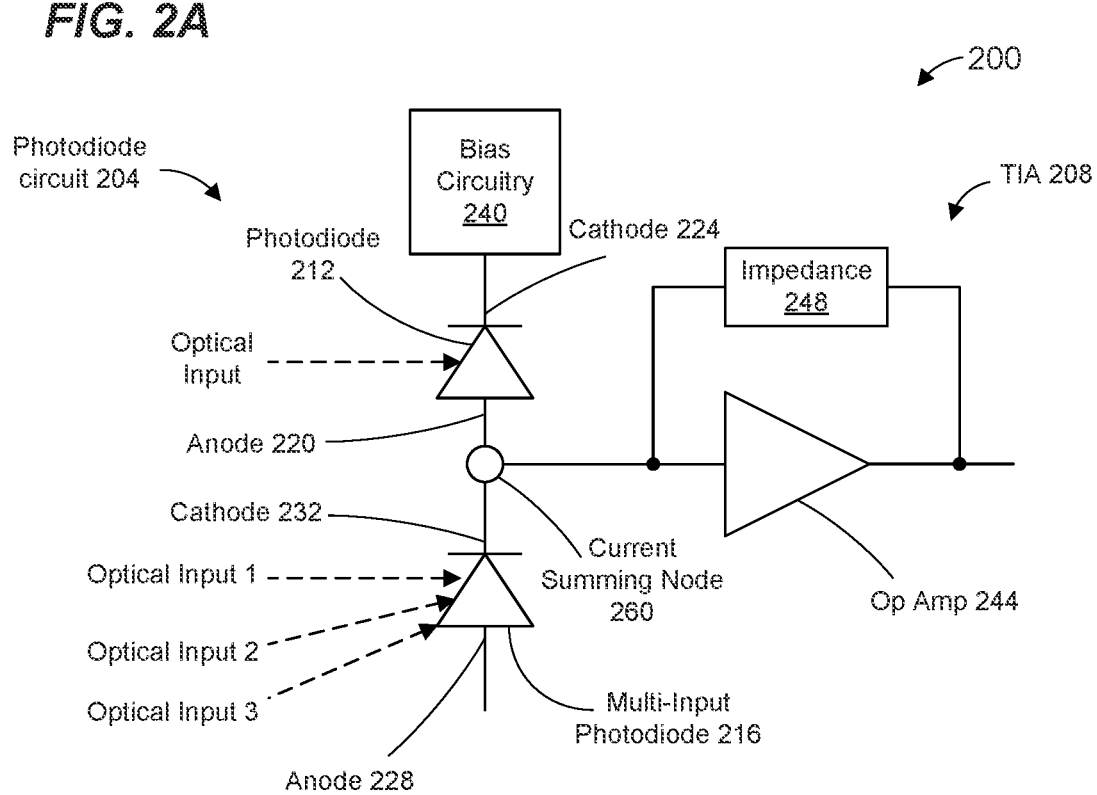
FIG. 2A is a simplified diagram of an example optical-to-electrical conversion circuit for use with reconfigurable optical receivers such as the reconfigurable optical receiver of FIG. 1A, according to an embodiment.

FIG. 2A is a simplified diagram of an example optical-to-electrical conversion circuit 200 for use with reconfigurable optical receivers such as the optical receiver 100, according to an embodiment. The optical-to-electrical conversion circuit 200 is described with reference to FIG. 1A for ease of explanation. In some embodiments, the optical-to-electrical conversion circuit 200 is used in another suitable reconfigurable optical receiver. Similarly, the optical receiver 100 uses a suitable optical-to-electrical conversion circuit that is different than the optical-to-electrical conversion circuit 200 of FIG. 2A.

In an embodiment, the optical-to-electrical conversion circuit 200 is used for each of i) the photodiode circuitry 124-1 and the TIA 128-1, ii) the photodiode circuitry 124-5 and the TIA 128-5, iii) the photodiode circuitry 124-9 and the TIA 128-9, and iv) the photodiode circuitry 124-13 and the TIA 128-13.

The optical-to-electrical conversion circuit 200 comprises a photodiode circuit 204 coupled to a TIA 208. The photodiode circuit 204 comprises a photodiode 212 and a multiple-input photodiode 216. The photodiode 212 comprises an anode 220 and a cathode 224, and the multiple-input photodiode 216 comprises an anode 228 and a cathode 232. The multiple-input photodiode 216 is coupled in series with the photodiode 212. For example, the cathode 232 of the multiple-input photodiode 216 is coupled to the anode 220 of the photodiode 212. In an embodiment, the anode 228 is coupled to ground.

The photodiode circuit 204 also comprises bias circuitry 240 that is configured to apply a reverse bias across the photodiode 212 and the multiple-input photodiode 216.

The TIA 208 comprises an operational amplifier 244 and an impedance 248 that is coupled between an input of the operational amplifier 244 and an output of the operational amplifier 244. In an embodiment, the impedance 248 is a suitable resistance. In an embodiment, the operational amplifier 244 comprises an additional input (not shown) coupled to ground.

In other embodiments, the TIA 208 comprises other suitable circuitry (e.g., that does not include an operational amplifier and/or does not include an impedance coupled between an input of the operational amplifier and an output of the operational amplifier) configured to convert a current signal to a voltage signal. As merely an illustrative example, the TIA 208 comprises a common gate/common base amplifier.

The photodiode circuit 204 includes a node 260 coupled between the photodiode 212 and the multiple input photodiode 216, and also coupled to the input of the operational amplifier 244. The node 260 outputs a current to the operational amplifier 244 that is a sum of i) current flowing from the anode 220 and ii) current flowing from the cathode 232. In other words, the node 260 outputs a current to the operational amplifier 244 that is a difference of i) current flowing from the anode 220 and ii) current flowing into the cathode 232.

In an embodiment, the node 260 comprises a connection between the anode 220 and the cathode 232. In other embodiments, the node 260 comprises one or more passive components (not shown). For example, the node 260 comprises a first resistor (not shown) in series with the photodiode 212 and a second resistor (not shown) in series with the multiple-input photodiode 216. In other embodiments, the node comprises one or more active components (not shown). For example, the node 260 comprises one or more transistors (not shown) arranged to act as an amplifier and/or buffer between i) the photodiode 212 and the multiple-input photodiode 216, and ii) the TIA 208.

In operation, when no optical signal illuminates the photodiode 212 and when no optical signals illuminate the multiple-input photodiode 216, the DC bias current flows through the photodiode 212 and through the multiple-input photodiode 216. On the other hand, when an optical signal illuminates the photodiode 212, a current flowing out of the anode 220 increases with the intensity of light illuminating the photodiode 212. Similarly, when an optical signal illuminates the multiple-input photodiode 216, a current flowing into the cathode 232 increases with the intensity of light illuminating the multiple-input photodiode 216. Additionally, as discussed above, current output by the node 260 corresponds to a difference of i) current flowing from the anode 220 and ii) current flowing into the cathode 232. The TIA 208 acts to convert the current signal output by the node 260 to a voltage signal.

In the example of FIG. 2A, the multiple-input photodiode 216 is configured to receive three optical signals. In other embodiments, the multiple-input photodiode 216 is configured to receive two optical signals. For example, in an embodiment in which the optical-to-electrical conversion circuit 200 is used for the photodiode circuitry 124-1 and the TIA 128-1, the multiple-input photodiode 216 receives a first optical signal from the optical demultiplexer 112 and a second optical signal from the coherent intradyne 2-pol 90-degree hybrid 120-1.

In an embodiment, the multiple-input photodiode 216 comprises an active region having a size configured to accommodate receiving optical signals from multiple sources. For example, the size of the active region is configured to accommodate receiving optical signals from at least the optical demultiplexer 112 and the coherent intradyne 2-pol 90-degree hybrid 120. In an embodiment, the size of the active region of the multiple-input photodiode 216 is substantially larger (i.e., at least 20% larger) than a size of an active region of the photodiode 212. In other embodiments, the size of the active region of the multiple-input photodiode 216 is not substantially larger than the size of the active region of the photodiode 212.

Referring now to FIGS. 1A and 2A, in an embodiment, the coherent intradyne 2-pol 90-degree hybrid 120 is optically coupled to the photodiode 212 via a waveguide that guides light from an output of the coherent intradyne 2-pol 90-degree hybrid 120 to the multiple-input photodiode 216. In another embodiment, the coherent intradyne 2-pol 90-degree hybrid 120 is optically coupled to the photodiode 212 via a fiber optic cable that guides light from an output of the coherent intradyne 2-pol 90-degree hybrid 120 to the photodiode 212. In another embodiment, the photodiode 212 receives light from an output of the coherent intradyne 2-pol 90-degree hybrid 120 via free space.

In an embodiment, the optical demultiplexer 112 is optically coupled to the multiple-input photodiode 216 via a first waveguide that guides light from an output of the optical demultiplexer 112 to the multiple-input photodiode 216; and a coherent intradyne 2-pol 90-degree hybrid 120 is optically coupled to the multiple-input photodiode 216 via a second waveguide that guides light from an output of the coherent intradyne 2-pol 90-degree hybrid 120 to the multiple-input photodiode 216. In some such embodiments, the active region of the multiple-input photodiode 216 has a size configured to accommodate receiving light from the first waveguide and receiving light from the second waveguide.

In another embodiment, the optical demultiplexer 112 is optically coupled to the multiple-input photodiode 216 via a first fiber optic cable that guides light from an output of the optical demultiplexer 112 to the multiple-input photodiode 216; and a coherent intradyne 2-pol 90-degree hybrid 120 is optically coupled to the multiple-input photodiode 216 via a second fiber optic cable that guides light from an output of the coherent intradyne 2-pol 90-degree hybrid 120 to the multiple-input photodiode 216. In some such embodiments, the active region of the multiple-input photodiode 216 has a size configured to accommodate receiving light from the first fiber optic cable and receiving light from the second fiber optic cable.

In another embodiment, the multiple-input photodiode 216 receives light from an output of the optical demultiplexer 112 via free space, and receives light from an output of the coherent intradyne 2-pol 90-degree hybrid 120 via free space. In some such embodiments, the active region of the multiple-input photodiode 216 has a size configured to accommodate receiving light from the optical demultiplexer 112 via free space and receiving light from the output of the coherent intradyne 2-pol 90-degree hybrid 120 via free space.

In other embodiments, the multiple-input photodiode 216 receives light from an output of the optical demultiplexer 112 via one of a waveguide, a fiber optic cable, free space, etc., and receives light from an output of the coherent intradyne 2-pol 90-degree hybrid 120 via another one of a waveguide, a fiber optic cable, free space, etc. In some such embodiments, the active region of the multiple-input photodiode 216 has a size configured to accommodate receiving light from the optical demultiplexer 312 via the one of a waveguide, a fiber optic cable, free space, etc., and receiving light from the output of the coherent intradyne 2-pol 90-degree hybrid 120 via the other one of a waveguide, a fiber optic cable, free space, etc.

The different optical signals that the multiple-input photodiode 216 is configured to receive correspond to different modulation techniques. For example, in the optical receiver 100, the one of the optical signals that the multiple-input photodiode 216 is configured to receive corresponds to an IMDD optical signal, and another one of the optical signals that the multiple-input photodiode 216 is configured to receive corresponds to a DQPSK-modulated signal or an intradyne M-QAM-modulated signal.

Figure 2B:
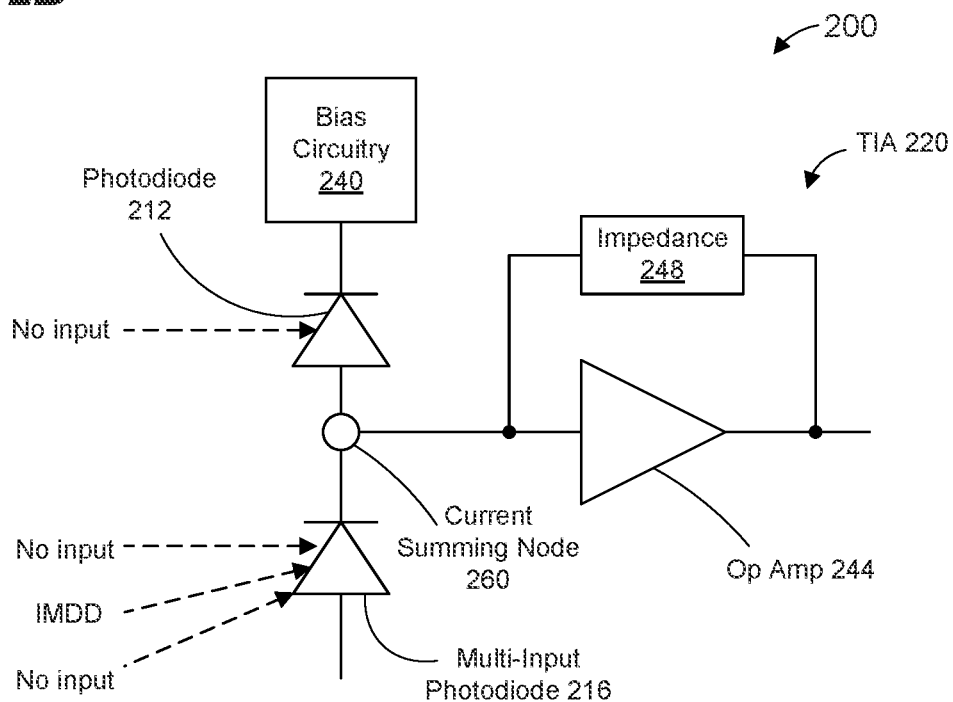
FIG. 2B is a diagram of the optical-to-electrical conversion circuit of FIG. 2A operating when the optical receiver is operating in the first configuration corresponding to FIG. 1B, according to an embodiment.

FIG. 2B is a diagram of the optical-to-electrical conversion circuit 200 of FIG. 2A operating when the optical receiver 100 is operating in the first configuration, such as described above with reference to FIGS. 1A and 1B, according to an embodiment. For example, when the optical-to-electrical conversion circuit 200 is used as the photodiode circuit 124-1 and the TIA 128-1, the multiple-input photodiode 216 does not receive an optical signal from the coherent intradyne 2-pol 90-degree hybrid 120-1. Rather, the multiple-input photodiode 216 receives an optical signal (e.g., an IMDD signal) from the optical demultiplexer 112. Additionally, the photodiode 212 does not receive an optical signal from the coherent intradyne 2-pol 90-degree hybrid 120-1. Thus, the current signal output from the node 260 reflects variations in the intensity of light in the IMDD signal from the optical demultiplexer 112. The TIA 220 converts this current signal to a voltage signal.

Figure 2C:
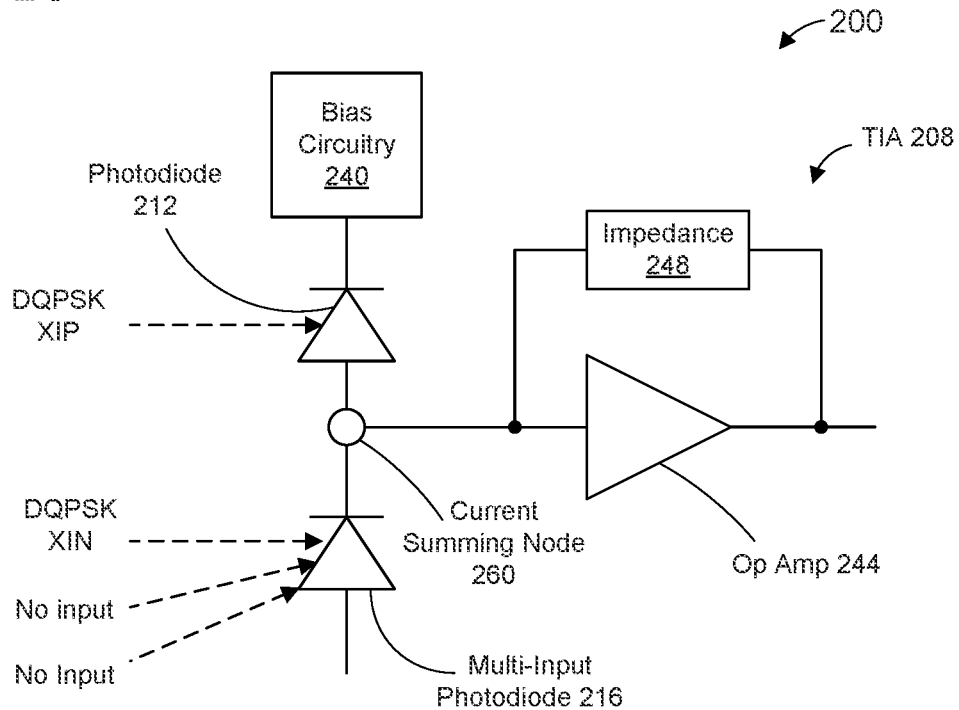
FIG. 2C is a diagram of the optical-to-electrical conversion circuit of FIG. 2A operating when the optical receiver is operating in the second configuration corresponding to FIG. 1C, according to an embodiment.

FIG. 2C is a diagram of the optical-to-electrical conversion circuit 200 of FIG. 2A operating when the optical receiver 100 is operating in the second configuration, such as described above with reference to FIGS. 1A, 1C, and 1E, according to an embodiment. For example, when the optical-to-electrical conversion circuit 200 is used as the photodiode circuit 124-1 and the TIA 128-1 of FIG. 1C, the photodiode 212 receives a first optical signal (e.g., a first DQSPK signal) from the coherent intradyne 2-pol 90-degree hybrid 120-1, such as an optical signal corresponding to Equation 1. Additionally, the multiple-input photodiode 216 does not receive an optical signal from the optical demultiplexer 112. Rather, the multiple-input photodiode 216 receives a second optical signal (e.g., a second DQSPK signal) from the coherent intradyne 2-pol 90-degree hybrid 120-1, such as an optical signal corresponding to Equation 2. Thus, the current signal output from the node 260 corresponds to a difference of i) current flowing from the anode 220 due to the first optical signal and ii) current flowing into the cathode 232 due to the second optical signal.

When the first optical signal corresponds to Equation 1 and the second optical signal corresponds to Equation 2, the current signal output from the node 260 is proportional to:

$$P_{I,1}(t)-P_{I,2}(t)=\tfrac{1}{2}|A(t)||A_{LO}|\cos(\omega_{if}t+\theta_{if}) \quad \text{(Equation 9)}$$

The TIA 220 converts the current signal output by the node 260 to a voltage signal.

As another example, when the optical-to-electrical conversion circuit 200 is used as the photodiode circuit 124-1 and the TIA 128-1 of FIG. 1D, the photodiode 212 receives a first optical signal (e.g., a first DQSPK signal) from the set of DLIs 120-1, such as an optical signal corresponding to Equation 5. Additionally, the multiple-input photodiode 216 does not receive an optical signal from the optical demultiplexer 112. Rather, the multiple-input photodiode 216 receives a second optical signal (e.g., a second DQSPK signal) from the set of DLIs 120-1, such as an optical signal corresponding to Equation 6. Thus, the current signal output from the node 260 corresponds to a difference of i) current flowing from the anode 220 due to the first optical signal and ii) current flowing into the cathode 232 due to the second optical signal.

When the first optical signal corresponds to Equation 5 and the second optical signal corresponds to Equation 6, the current signal output from the node 260 is proportional to:

$$P_{I,1}(t)-P_{I,2}(t)=A(t)A(t-T_s) \quad \text{(Equation 10)}$$

where A(t) equals:

$$A(t)=\text{sqrt}(P_0)\exp[i\varphi(t)] \quad \text{(Equation 11)}$$

Where $P_0$ is a constant and $\varphi(t)$ is the phase of the optical signal. Then, the current signal output from the node 260 is proportional to:

$$P_{I,1}(t)-P_{I,2}(t)=\cos(\Delta\varphi) \quad \text{(Equation 12)}$$

where $\Delta\varphi(t)=\varphi(t)-\varphi(t-Ts)$, and is 0 or $\pi$ depending on the bit transmitted.

The TIA 220 converts the current signal output by the node 260 to a voltage signal. In DQPSK, $\Delta\varphi=0$ or $\pi$ depending on the bit transmitted, and the DSP 144 can reconstruct the original bit stream from the output of the TIA 220.

Figure 2D:
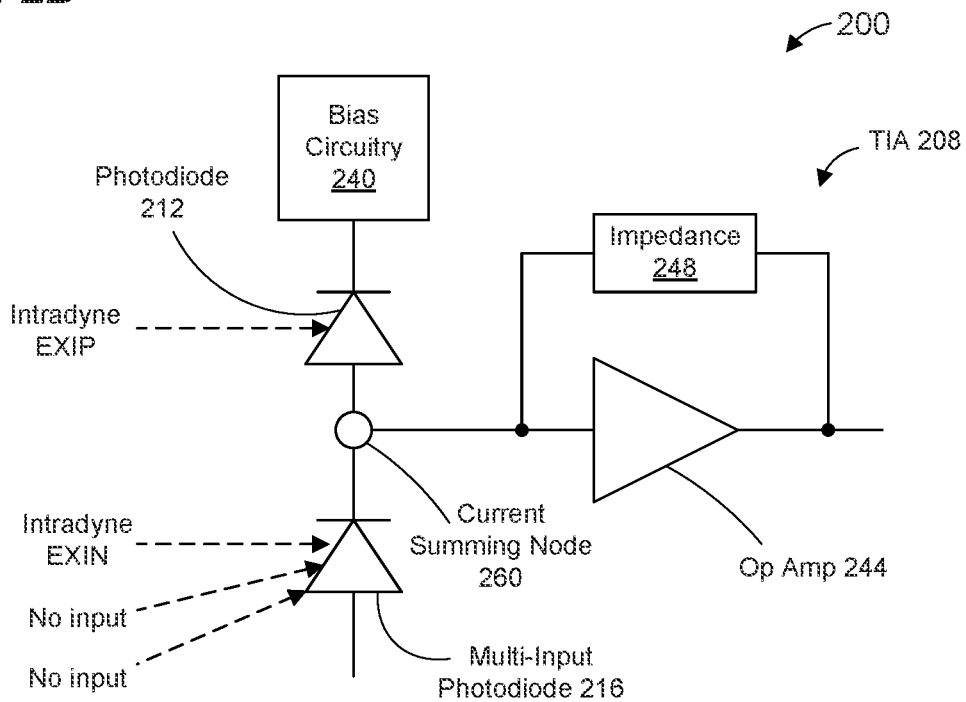
FIG. 2D is a diagram of the optical-to-electrical conversion circuit of FIG. 2A operating when the optical receiver is operating in the third configuration corresponding to FIG. 1E, according to an embodiment.

FIG. 2D is a diagram of the optical-to-electrical conversion circuit 200 of FIG. 2A operating when the optical receiver 100 is operating in the configuration corresponding to intradyne M-QAM demodulation, according to an embodiment. Referring again to FIGS. 1A and 1E, with intradyne M-QAM demodulation, each coherent intradyne 2-pol 90-degree hybrid 120 mixes optical signals from a corresponding PBS 104 with a local oscillator signal (not shown) as part of generating the output signals. When the optical-to-electrical conversion circuit 200 is used as the photodiode circuit 124-1 and the TIA 128-1, the photodiode 212 receives a first optical signal (e.g., a first intradyne M-QAM signal) from the coherent intradyne 2-pol 90-degree hybrid 120-1, such as an optical signal corresponding to Equation 1. Additionally, the multiple-input photodiode 216 does not receive an optical signal from the optical demultiplexer 112. Rather, the multiple-input photodiode 216 receives a second optical signal (e.g., a second intradyne M-QAM signal) from the coherent intradyne 2-pol 90-degree hybrid 120-1, such as an optical signal corresponding to Equation 2. Thus, the current signal output from the node 260 corresponds to a difference of i) current flowing from the anode 220 due to the first optical signal and ii) current flowing into the cathode 232 due to the second optical signal.

When the first optical signal corresponds to Equation 1 and the second optical signal corresponds to Equation 2, the current signal output from the node 260 is proportional to Equation 9. The TIA 220 converts the current signal output by the node 260 to a voltage signal.

Figure 3A:
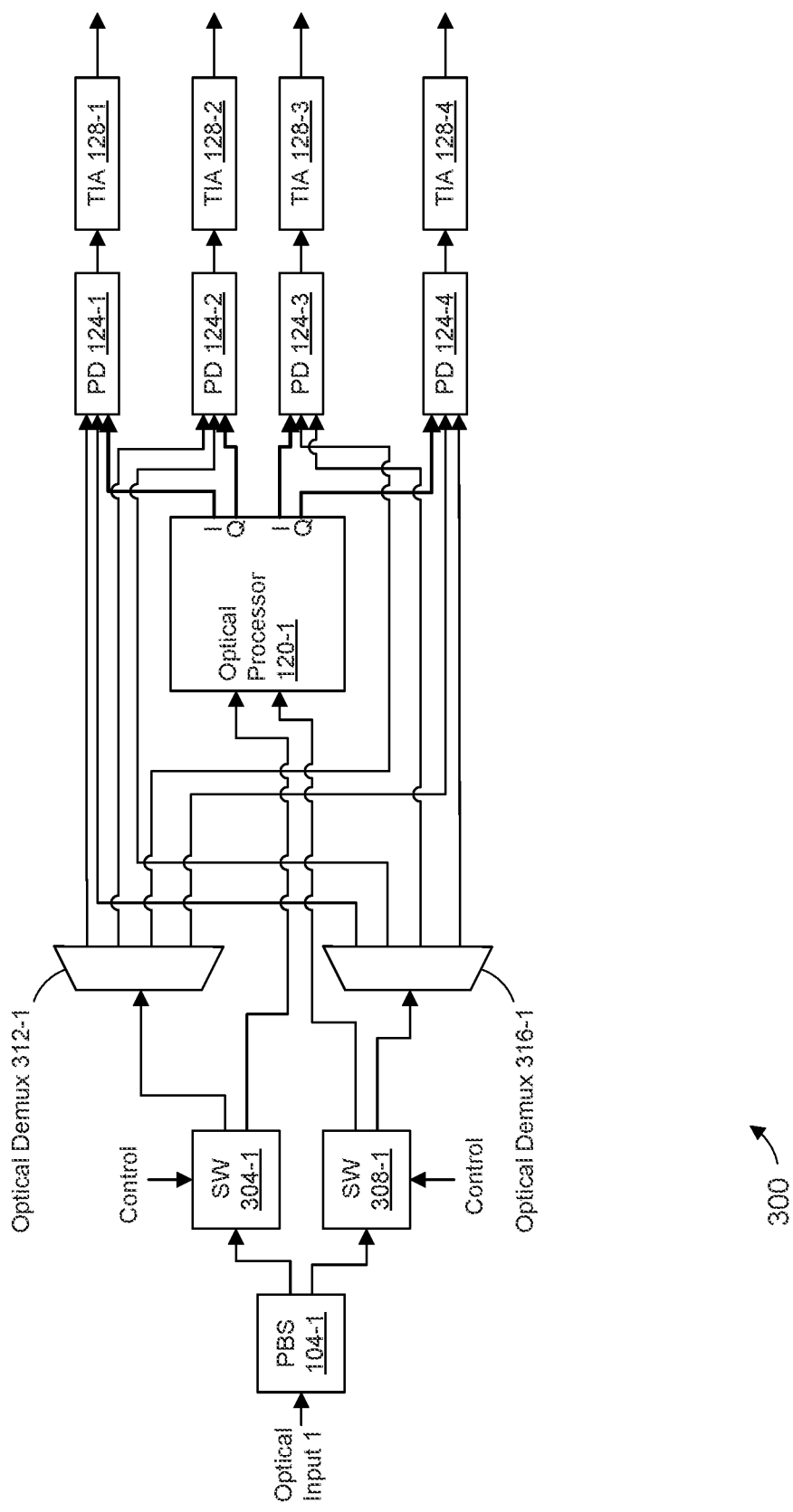
FIG. 3A is a simplified block diagram of another example reconfigurable optical receiver that is capable of demodulating optical signals that are modulated according to different optical modulation techniques, according to another embodiment.

FIG. 3A is a simplified block diagram of another example reconfigurable optical receiver 300 that is capable of demodulating optical signals that are modulated according to different optical modulation techniques, according to another embodiment. For instance, when the optical receiver 300 is in a first configuration, the optical receiver 300 is configured to receive and demodulate up to four dual polarization IMDD-modulated signals (or multiple dual polarization IMDD-modulated signals if multiplexed on multiple wavelengths) received via the optical inputs (optical input 1, optical input 2, optical input 3, optical input 4). When the optical receiver 300 is in a second configuration, the optical receiver 300 is configured to receive and demodulate up to four optical signals modulated using a different type of modulation such as QPSK modulation, dual polarization QPSK modulation, DQPSK modulation, dual polarization DQPSK, intradyne M-QAM modulation, dual polarization intradyne M-QAM modulation, etc. In the second configuration, the up to four optical signals are received via the first optical input (optical input 1) and optionally one or more of a second optical input (optical input 2), a third optical input (optical input 3), and a fourth optical input (optical input 4). The optical inputs are configured to receive optical signals from one or more suitable source(s), such as up to four fiber optic cables, in an embodiment.

The reconfigurable optical receiver 300 has many components that are the same as components of the reconfigurable optical receiver 100, and like-numbered elements are not described again in detail for purposes of brevity. Only components corresponding to one of the optical inputs (e.g., optical input 1) are shown in FIG. 3A to simplify the diagram, but similar components are included for each of the other optical inputs (e.g., optical input 2, optical input 3, optical input 4). Additionally, the reconfigurable optical receiver 300 includes the ADCs 132 and the DSP 144 of FIG. 1A, but the ADCs 132 and the DSP 144 are not shown in FIG. 3A to simplify the diagram.

In the reconfigurable optical receiver 300, the optical switch 108 and the optical demultiplexer 112 are omitted. Rather, the PBS 104 receives an optical input (e.g., optical input 1), and the outputs of the PBS 104 are coupled to optical switches 304 and 308. In particular, the PBS 104 includes a first output coupled to an input of the optical switch 304, and includes a second output coupled to an input of the optical switch 308. The optical switch 304 includes a first output that is coupled to an input of an optical demultiplexer 312, and includes a second output that is coupled to a first input of the optical processor 120. The optical switch 308 includes a first output that is coupled to an input of an optical demultiplexer 316, and includes a second output that is coupled to a second input of the optical processor 120.

The optical switch 304 is configured to selectively couple, based on a control signal, the first output of the PBS 104 to either the optical demultiplexer 312 or the first input of the optical processor 120. In the first configuration of the optical receiver 300 (e.g., when a dual-polarization IMDD-modulated signal (or multiple dual-polarization IMDD-modulated signals if multiplexed on multiple wavelengths) is received via optical input 1), the control signal controls the optical switch 304 to optically couple the first output of the PBS 104 to the input of the optical demultiplexer 312. In the second configuration of the optical receiver 300 (e.g., when optical input 1 corresponds to QPSK modulation, dual polarization QPSK modulation, DQPSK modulation, dual polarization DQPSK, intradyne M-QAM, dual polarization intradyne M-QAM, etc.), the control signal controls the optical switch 304 to optically couple the first output of the PBS 104 to the first input of the optical processor 120.

The optical switch 308 is configured to selectively couple, based on a control signal, the second output of the PBS 104 to either the optical demultiplexer 316 or the second input of the optical processor 120. In the first configuration of the optical receiver 300 (e.g., when a dual-polarization IMDD-modulated signal (or multiple dual-polarization IMDD-modulated signals if multiplexed on multiple wavelengths) is received via optical input 1), the control signal controls the optical switch 308 to optically couple the second output of the PBS 104 to the input of the optical demultiplexer 316. In the second configuration of the optical receiver 300 (e.g., when optical input 1 corresponds to QPSK modulation, dual polarization QPSK modulation, DQPSK modulation, dual polarization DQPSK, intradyne M-QAM, dual polarization intradyne M-QAM, etc.), the control signal controls the optical switch 308 to optically couple the second output of the PBS 104 to the second input of the optical processor 120.

In an embodiment, the optical receiver 300 comprises a controller (not shown) that generates the control signals provided to the optical switches 304, 308. In an embodiment, the controller comprises a processor configured to execute machine-readable instructions stored in a memory coupled to the processor. In another embodiment, the controller comprises a hardware circuitry (e.g., a hardware state machine).

The optical demultiplexer 312 is configured to demultiplex multiple optical signals at respective wavelengths from light received via the first output of the PBS 104, the multiple optical signals having been multiplexed at a transmitter. The demultiplexed optical signals are output via respective outputs of the optical demultiplexer 312, which are optically coupled to the photodiode circuits 124, respectively. Thus, in the first configuration demultiplexed IMDD signals in a first polarization direction are provided to the photodiode circuits 124.

The optical demultiplexer 316 is configured to demultiplex multiple optical signals at respective wavelengths from light received via the second output of the PBS 104, the multiple optical signals having been multiplexed at a transmitter. The demultiplexed optical signals are output via respective outputs of the optical demultiplexer 316, which are also optically coupled to the photodiode circuits 124, respectively. Thus, in the first configuration demultiplexed IMDD signals in a second polarization direction are also provided to the photodiode circuits 124.

As can be seen from FIG. 3A, each of the photodiode circuits 124 is optically coupled to i) a respective output of the optical demultiplexer 312, ii) a respective output of the optical demultiplexer 316, and iii) respective outputs of a respective optical processor 120. Each of the photodiode circuits 124 includes a multiple-input photodiode that is configured to receive i) a respective output of the optical demultiplexer 312, ii) a respective output of the optical demultiplexer 316, and iii) respective outputs of a respective optical processor 120.

As will be described further below, when the optical receiver 300 is in a first configuration, each of the photodiode circuits 124 receives i) a first respective IMDD modulated signal in a first polarization direction from the optical demultiplexer 312, and ii) a second respective IMDD modulated signal in a second polarization direction from the optical demultiplexer 316; and when the optical receiver 300 is in a second configuration, each of the photodiode circuits 124 receives a set of optical signals from a respective optical processor 120.

When the optical receiver 300 is in the first configuration, each of the photodiode circuits 124 is configured to generate a current signal that corresponds to i) a first respective IMDD modulated signal in a first polarization direction from the optical demultiplexer 312, and ii) a second respective IMDD modulated signal in a second polarization direction from the optical demultiplexer 316. When the optical receiver 300 is in the second configuration, each photodiode circuit 124 is configured to generate a current signal that corresponds to a subtraction of either i) a corresponding pair of I signals (e.g., Equations 1 and 2, or Equations 5 and 6), or ii) a corresponding pair of Q signals (e.g., Equations 3 and 4, or Equations 7 and 8), according to an embodiment.

Referring now to FIGS. 3A and 2A, in an embodiment, the optical demultiplexer 312 is optically coupled to the multiple-input photodiode 216 via a first waveguide that guides light from an output of the optical demultiplexer 312 to the multiple-input photodiode 216; the optical demultiplexer 316 is optically coupled to the multiple-input photodiode 216 via a second waveguide that guides light from an output of the optical demultiplexer 316 to the multiple-input photodiode 216; and an optical processor 120 is optically coupled to the multiple-input photodiode 216 via a third waveguide that guides light from an output of the optical processor 120 to the multiple-input photodiode 216. In some such embodiments, the active region of the multiple-input photodiode 216 has a size configured to accommodate receiving light from the first waveguide, receiving light from the second waveguide, and receiving light from the third waveguide.

In another embodiment, the optical demultiplexer 312 is optically coupled to the multiple-input photodiode 216 via a first fiber optic cable that guides light from an output of the optical demultiplexer 312 to the multiple-input photodiode 216; the optical demultiplexer 316 is optically coupled to the multiple-input photodiode 216 via a second fiber optic cable that guides light from an output of the optical demultiplexer 316 to the multiple-input photodiode 216; and an optical processor 120 is optically coupled to the multiple-input photodiode 216 via a third fiber optic cable that guides light from an output of the optical processor 120 to the multiple-input photodiode 216. In some such embodiments, the active region of the multiple-input photodiode 216 has a size configured to accommodate receiving light from the first fiber optic cable, receiving light from the second fiber optic cable, and receiving light from the third fiber optic cable.

In another embodiment, the multiple-input photodiode 216 receives light from an output of the optical demultiplexer 312 via free space; receives light from an output of the optical demultiplexer 316 via free space; and receives light from an output of the optical processor 120 via free space. In some such embodiments, the active region of the multiple-input photodiode 216 has a size configured to accommodate receiving light from the optical demultiplexer 312 via free space, receiving light from the optical demultiplexer 316 via free space, and receiving light from the output of the optical processor 120 via free space.

In other embodiments, the multiple-input photodiode 216 receives light from an output of the optical demultiplexer 312 via one of a waveguide, a fiber optic cable, free space, etc.; receives light from an output of the optical demultiplexer 316 via one of a waveguide, a fiber optic cable, free space, etc., and receives light from an output of the optical processor 120 via one of a waveguide, a fiber optic cable, free space, etc. In some such embodiments, the active region of the multiple-input photodiode 216 has a size configured to accommodate receiving light from the optical demultiplexer 312 via the one of a waveguide, a fiber optic cable, free space, etc., receiving light from the optical demultiplexer 316 via the one of a waveguide, a fiber optic cable, free space, etc., and receiving light from the output of the optical processor 120 via one of a waveguide, a fiber optic cable, free space, etc.

Although the optical receiver 300 was described as receiving and processing four optical inputs, in other embodiments the optical receiver 300 includes components for receiving and processing another suitable number of optical inputs.

Although FIG. 3A illustrates optical demultiplexers 312, 316 that are configured to demultiplex four multiplexed optical signals, in other embodiments the optical receiver 300 includes optical demultiplexers that are configured to demultiplex other suitable numbers of multiplexed optical signals.

Figure 3B:
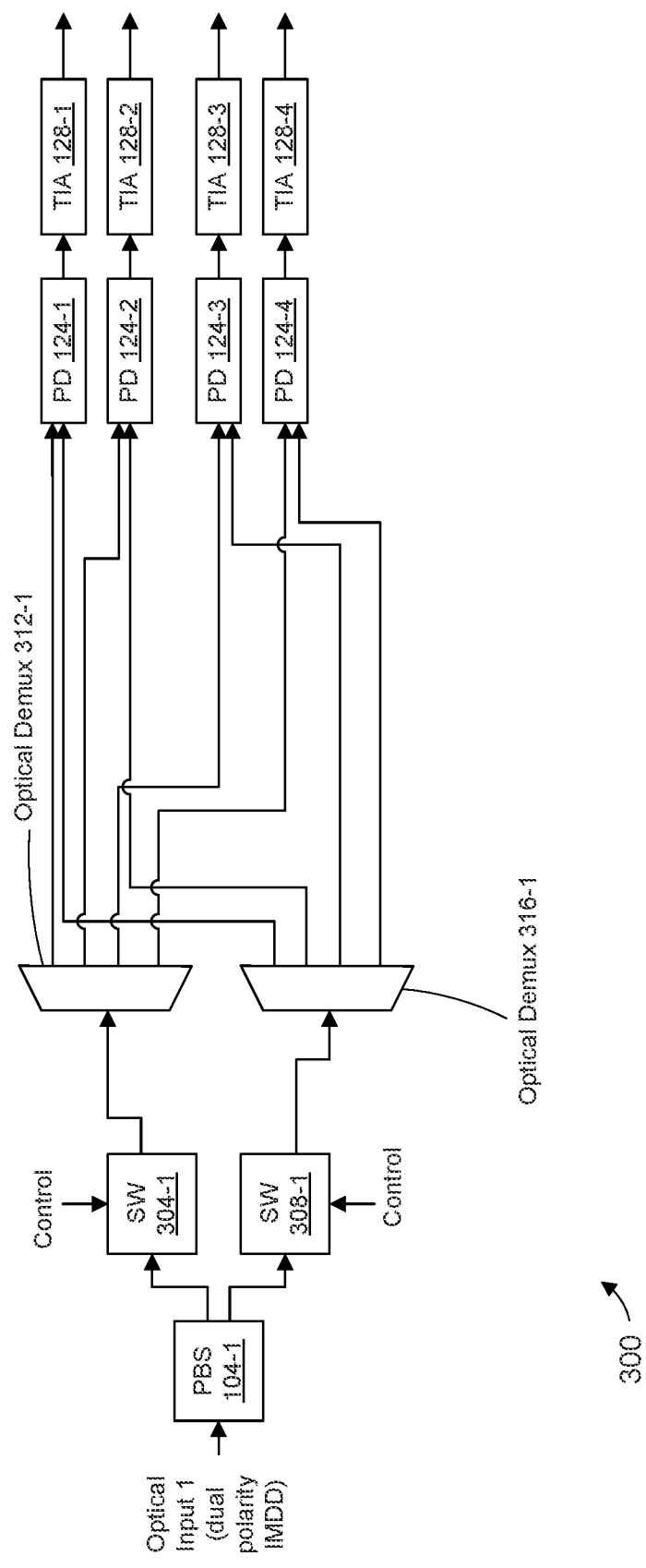
FIG. 3B is an illustration of the optical receiver of FIG. 3A in a first configuration in which the optical receiver is configured to receive and demodulate signals modulated according to a first modulation technique, according to an embodiment.

FIG. 3B is an illustration of the optical receiver 300 in a first configuration in which the optical receiver 300 is configured to receive and demodulate multiple dual polarization IMDD-modulated signals multiplexed on multiple wavelengths, according to an embodiment. The dual polarization IMDD-modulated signals multiplexed on multiple wavelengths are received via optical input 1.

In the first configuration, the control signal provided to the optical switch 304 controls the optical switch 304 to direct optical signals in a first polarization direction received via optical input to the optical demultiplexer 312, and the control signal provided to the optical switch 308 controls the optical switch 308 to direct optical signals in a second polarization direction received via optical input to the optical demultiplexer 316. Thus, no optical signals are provided to the optical processor 120 (FIG. 3A), and the optical processor 120 does not provide any optical signals to the photodiode circuits 124. Accordingly, the optical processor 120 is not illustrated in FIG. 3B to help show the paths of optical signals through the optical receiver 300 while in the first configuration.

The optical demultiplexer 312 demultiplexes the optical signals in the first polarization direction received via the optical input into four outputs, which are provided to photodiode circuits 124, respectively. The optical demultiplexer 316 demultiplexes the optical signals in the second polarization direction received via the optical input into four outputs, which are also provided to photodiode circuits 124, respectively.

Each of the photodiode circuits 124 generates a current signal that corresponds to i) an IMDD modulated signal in the first polarization direction from the optical demultiplexer 312 and ii) an IMDD modulated signal in the second polarization direction from the optical demultiplexer 316. The TIAs 128 generate respective voltage signals based on the current signals from the photodiode circuits 124. The ADCs 132 convert the voltage signals from the TIAs 128 into respective digital domain signals, which are processed by the DSP 144 to recover information bits.

Figure 3C:
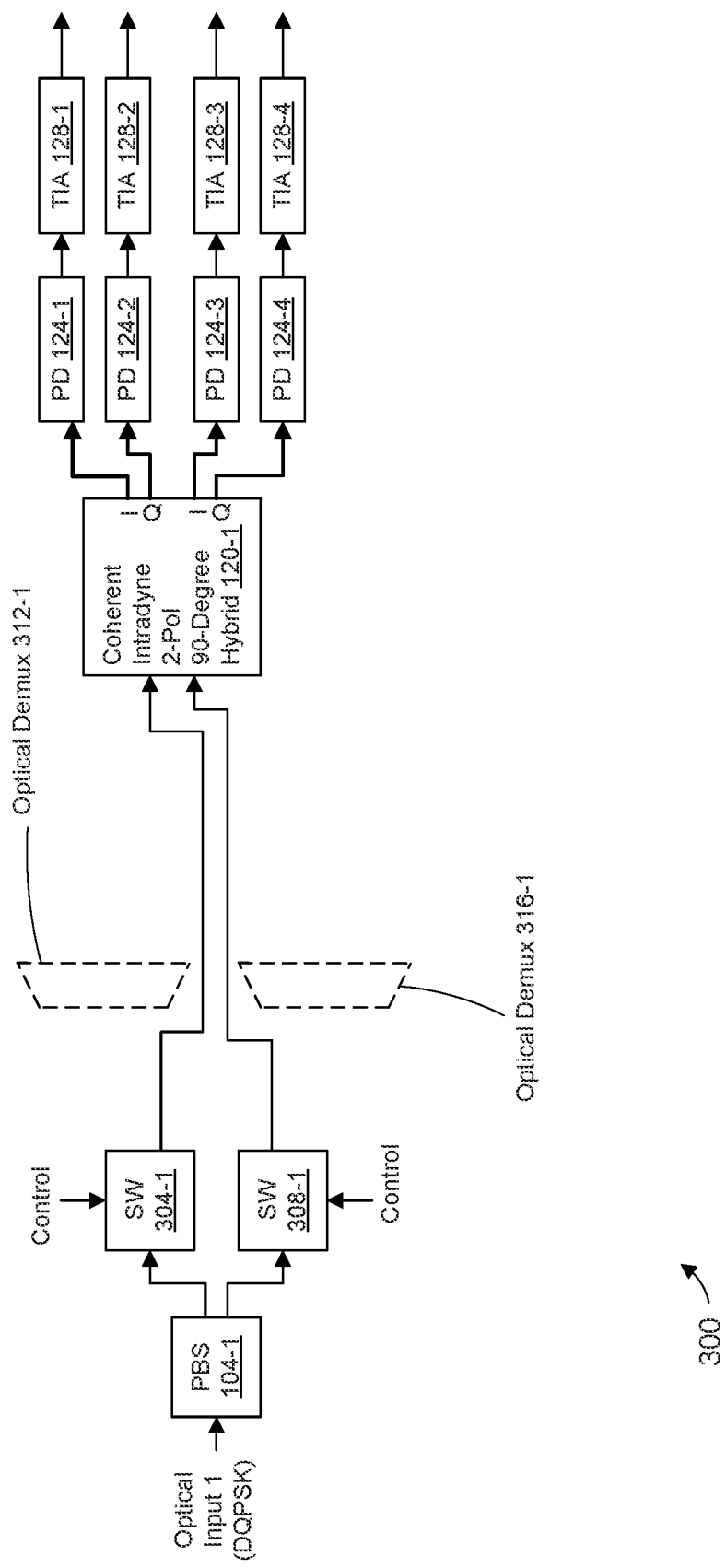
FIG. 3C is an illustration of the optical receiver of FIG. 3A in a second configuration in which the optical receiver is configured to receive and demodulate signals modulated according to a second modulation technique, according to an embodiment.

FIG. 3C is an illustration of the optical receiver 300 in a second configuration in which the optical receiver 300 is configured to receive and demodulate multiple DQPSK signals, according to an embodiment. In the embodiment of FIG. 3C, the optical processor 120 corresponds to a coherent intradyne 2-Pol 90-degree hybrid device. The DQPSK-modulated signals are received via the optical inputs.

In the second configuration, the control signal provided to the optical switch 304 controls the optical switch 304 to direct optical signals in the first polarization direction received via optical input 1 to the first input of the coherent intradyne 2-Pol 90-degree hybrid device 120, and the control signal provided to the optical switch 308 controls the optical switch 308 to direct optical signals in the second polarization direction received via optical input 1 to the second input of the coherent intradyne 2-Pol 90-degree hybrid device 120. As a result, optical demultiplexer 312 and optical demultiplexer 316 do not receive the optical signals. Thus, the optical demultiplexer 312 and optical demultiplexer 316 do not provide any optical signals to the photodiode circuits 124. Accordingly, the lines from the optical demultiplexer 312 to the photodiode circuits 124, and the lines from the optical demultiplexer 316 to the photodiode circuits 124, are not illustrated in FIG. 3C to help show the paths of optical signals through the optical receiver 300 while in the second configuration.

Each coherent intradyne 2-Pol 90-degree hybrid device 120 receives the first optical signal and the second optical signal from the corresponding PBS 104. The coherent intradyne 2-Pol 90-degree hybrid device 120 generates a pair of I signals and a pair of Q signals based on each output of the PBS 104, as discussed above.

Each photodiode circuit 124 receives a corresponding pair of I signals (e.g., Equations 1 and 2), or ii) a corresponding pair of Q signals (e.g., Equations 3 and 4) and generates a current signal that corresponds to a subtraction of i) the corresponding pair of I signals, or ii) the corresponding pair of Q signals.

The TIAs 128 generate respective voltage signals based on the current signals from the corresponding photodiode circuits 124, and outputs of the TIAs 128 are provided to respective ADCs 132. Each ADC 132 generates a digital-domain signal corresponding to the output of the respective TIA 128, and the DSP 144 processes the digital-domain signals to recover information bits.

Figure 3D:
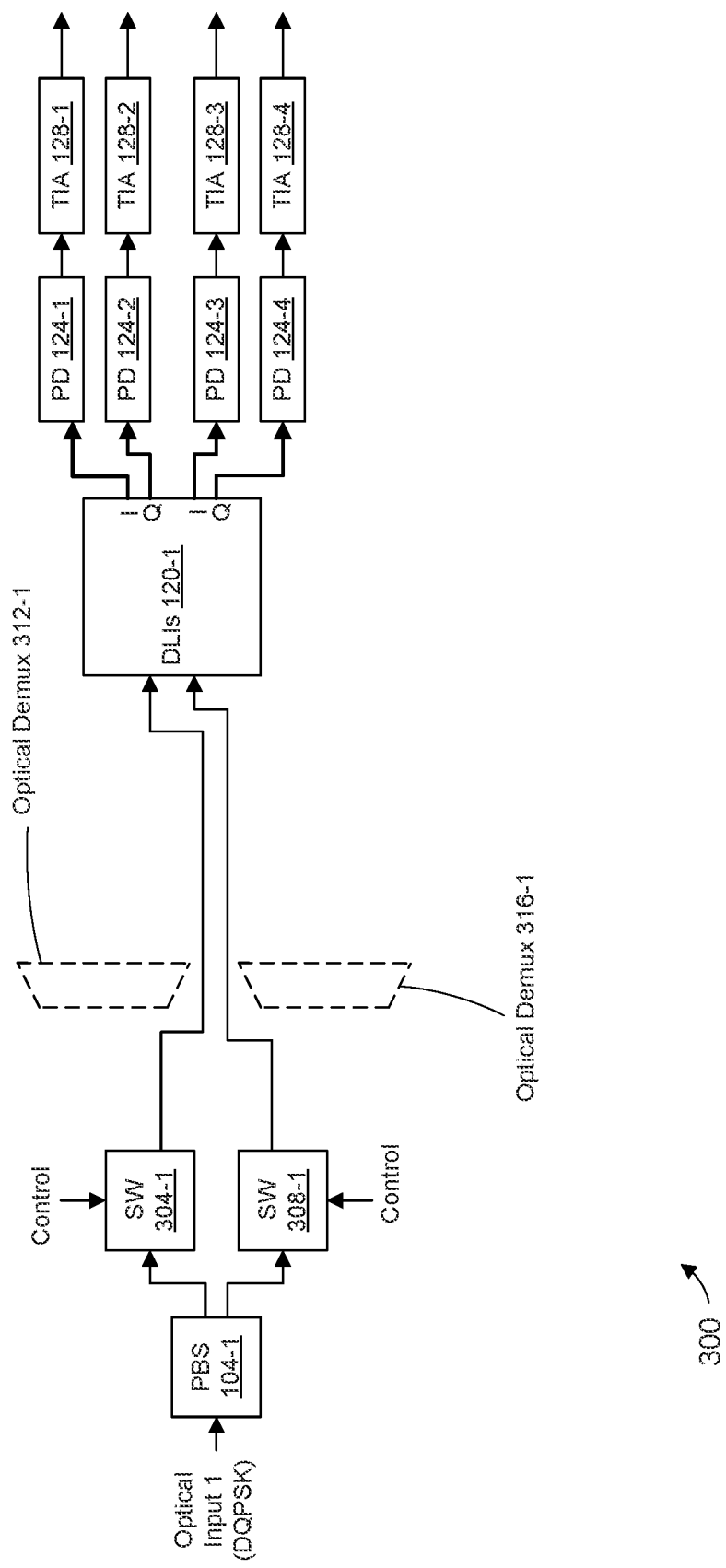
FIG. 3D is an illustration of the optical receiver of FIG. 3A in the second configuration in which the optical receiver is configured to receive and demodulate signals modulated according to the second modulation technique, according to another embodiment.

FIG. 3D is an illustration of the optical receiver 300 in a second configuration in which the optical receiver 300 is configured to receive and demodulate multiple DQPSK signals, according to another embodiment. In the embodiment of FIG. 3D, the optical processor 120 corresponds to a set of one or more DLIs.

The optical receiver 300 operates in a manner similar to the embodiment described with reference to FIG. 3C, but with the set of one or more DLIs 120 operating in a manner described above with reference to FIG. 1D.

In an embodiment, a respective polarization controller (PC) is coupled between each optical input and the input of each PBS 104.

Figure 3E:
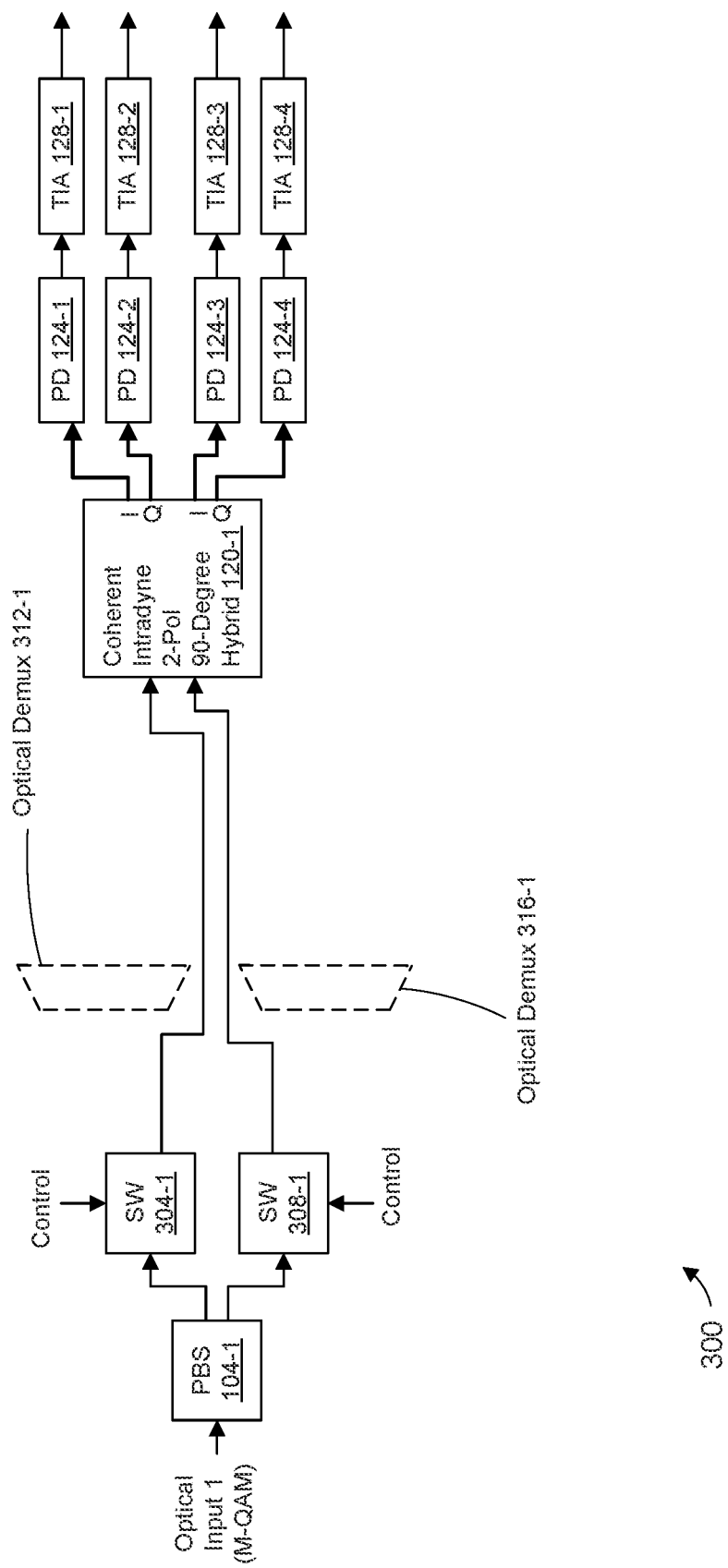
FIG. 3E is an illustration of the optical receiver of FIG. 3A in a third configuration in which the optical receiver is configured to receive and demodulate signals modulated according to a third modulation technique, according to an embodiment.

In addition to or instead of the first and second configurations described above, the optical receiver 300 can be configured to operate according to one or more other modulation schemes, according to some embodiments. For instance, FIG. 3E is an illustration of the optical receiver 300 in a third configuration in which the optical receiver 300 is configured to receive and demodulate multiple M-QAM intradyne-modulated signals, according to an embodiment. In the embodiment of FIG. 3E, the optical processor 120 corresponds to a coherent intradyne 2-Pol 90-degree hybrid device. The M-QAM intradyne-modulated signals are received via optical input 1, optical input 2, optical input 3, and optical input 4.

In the third configuration, the control signal provided to the optical switch 304 controls the optical switch 304 to direct optical signals in the first polarization direction received via optical input 1 to the first input of the coherent intradyne 2-Pol 90-degree hybrid device 120-1, and the control signal provided to the optical switch 308 controls the optical switch 308 to direct optical signals in the second polarization direction received via optical input 1 to the second input of the coherent intradyne 2-Pol 90-degree hybrid device 120-1. As a result, the optical demultiplexer 312 and the optical demultiplexer 316 do not receive the optical signals. Thus, the optical demultiplexer 312 and the optical demultiplexer 316 do not provide any optical signals to the photodiode circuits 124. Accordingly, the lines from the optical demultiplexer 312 to the photodiode circuits 124, and the lines from the optical demultiplexer 316 to the photodiode circuits 124, are not illustrated in FIG. 3E to help show the paths of optical signals through the optical receiver 100 while in the second configuration.

Each PBS 104 splits a corresponding input optical signal into a first output optical signal (corresponding to light polarized in a first direction) and a second output optical signal (corresponding to light polarized in a second direction). Each coherent intradyne 2-Pol 90-degree hybrid device 120 receives the first optical signal and the second optical signal from the corresponding PBS 104. The coherent intradyne 2-Pol 90-degree hybrid device 120 generates a pair of I signals and a pair of Q signals based on each output of the PBS 104, as discussed above.

Each photodiode circuit 124 receives a corresponding pair of I signals (e.g., Equations 1 and 2), or ii) a corresponding pair of Q signals (e.g., Equations 3 and 4) and generates a current signal that corresponds to a subtraction of i) the corresponding pair of I signals, or ii) the corresponding pair of Q signals.

The TIAs 128 generate respective voltage signals based on the current signals from the corresponding photodiode circuits 124, and outputs of the TIAs 128 are provided to respective ADCs 132. Each ADC 132 generates a digital-domain signal corresponding to the output of the respective TIA 128, and the DSP 144 processes the digital-domain signals to recover information bits.

Figure 4:
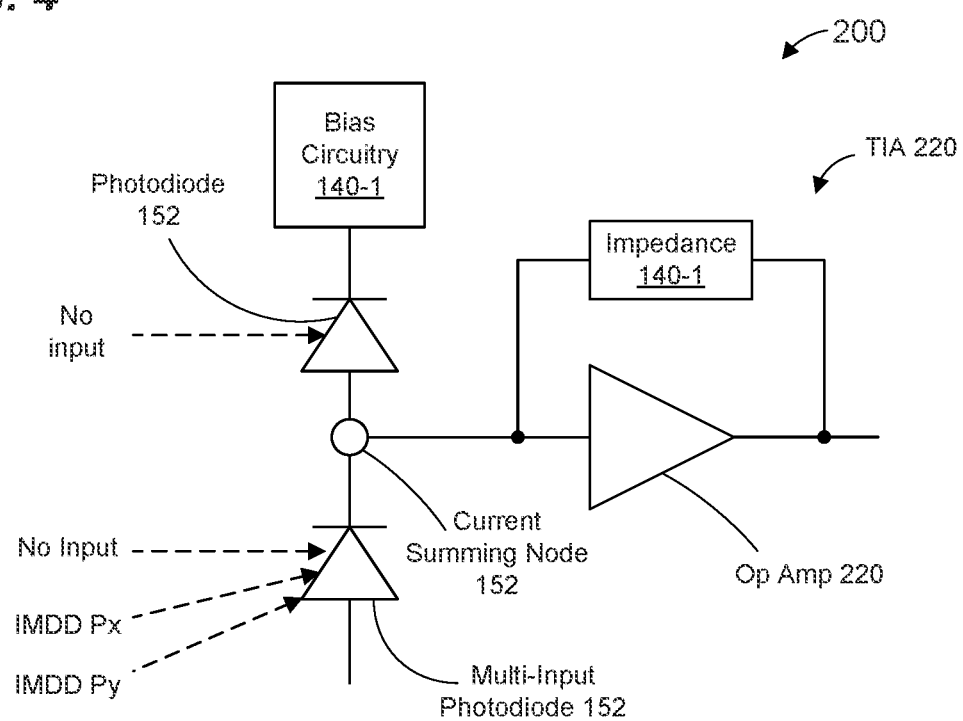
FIG. 4 is a diagram of the optical-to-electrical conversion circuit of FIG. 2A operating when the optical receiver is operating in the first configuration corresponding to FIG. 3B, according to an embodiment.

FIG. 4 is a diagram of the optical-to-electrical conversion circuit 200 of FIG. 2A operating when the optical receiver 300 is operating in the first configuration, such as described above with reference to FIGS. 3A and 3B, according to an embodiment. For example, when the optical-to-electrical conversion circuit 200 is used as the photodiode circuit 124-1 and the TIA 128-1, the multiple-input photodiode 216 does not receive an optical signal from the coherent intradyne 2-pol 90-degree hybrid 120-1. Rather, the multiple-input photodiode 216 receives a first optical signal in a first polarization direction (e.g., a first IMDD signal in a first polarization direction) from the optical demultiplexer 312, and receives a second optical signal in a second polarization direction (e.g., a second IMDD signal in a second polarization direction) from the optical demultiplexer 316. Additionally, the photodiode 212 does not receive an optical signal from the coherent intradyne 2-pol 90-degree hybrid 120. Thus, the current signal output from the node 260 reflects variations in the intensity of light in the first IMDD signal in the first polarization direction from the optical demultiplexer 312 and of light in the second IMDD signal in the second polarization direction from the optical demultiplexer 316. The TIA 220 converts this current signal to a voltage signal.

Figure 5:
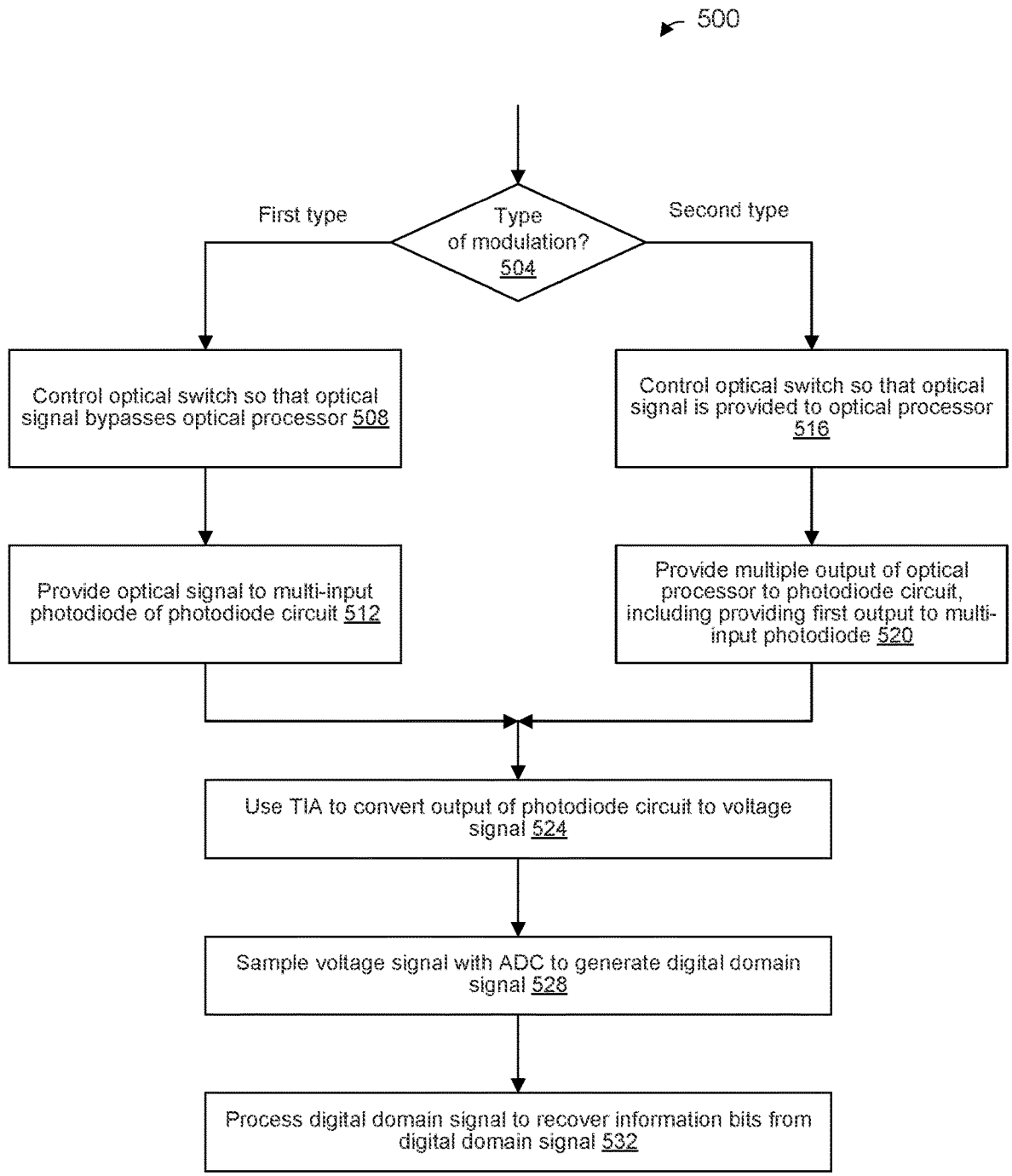
FIG. 5 is a flow diagram of an example method for operating a reconfigurable optical receiver that is capable of demodulating optical signals that are modulated according to different optical modulation techniques, according to an embodiment.

FIG. 5 is a flow diagram of an example method 500 for operating a reconfigurable optical receiver that is capable of demodulating optical signals that are modulated according to different optical modulation techniques, according to an embodiment. The method 500 is implemented using the reconfigurable optical receiver of FIG. 1A, in an embodiment. The method 500 is implemented using the reconfigurable optical receiver of FIG. 3A, in another embodiment. FIG. 5 is described with reference to FIGS. 1A and 3A for explanatory purposes. In other embodiments, the method 500 is implemented using another suitable reconfigurable optical receiver different than the reconfigurable optical receivers of FIGS. 1A and 3A.

At block 504, a type of modulation that the reconfigurable optical receiver is to process is determined. The reconfigurable optical receiver is capable of demodulating optical signals that are modulated according to a plurality of different types of optical modulation techniques, including at least a first type and a second type. In an embodiment, the first type does not involve use of an optical processor of the reconfigurable optical receiver, and the second type involves use of an optical processor. For example, the first type corresponds to IMDD modulation, and the second type corresponds to DQPSK or M-QAM intradyne, in an embodiment.

In an embodiment, the controller of the optical receiver 100 determines the type of modulation at block 504. In another embodiment, the controller of the optical receiver 300 determines the type of modulation at block 504.

In response to determining at block 504 that the type of modulation that the reconfigurable optical receiver is to process is the first type, the flow proceeds to block 508. At block 508, an optical switch of the reconfigurable optical receiver is controlled so that an optical signal corresponding to a signal received by the reconfigurable optical receiver bypasses an optical processor of the reconfigurable optical receiver. For example, each optical switch 108 (FIG. 1A) is controlled so that the corresponding optical input signal is provided to the optical demultiplexer 112, and an output of the optical demultiplexer 112 bypasses the optical processor 120. For example, the controller of the optical receiver 100 generates a control signal to control the optical switch 108.

As another example, the optical switch 304 (FIG. 3A) is controlled so that an optical signal in a first polarity direction is provided to the optical demultiplexer 312, and an output of the optical demultiplexer 312 bypasses the optical processor 120. As yet another example, the optical switch 308 (FIG. 3A) is controlled so that an optical signal in a second polarity direction is provided to the optical demultiplexer 316, and an output of the optical demultiplexer 316 bypasses the optical processor 120. For example, the controller of the optical receiver 300 generates the control signals to control the optical switches 304, 308.

At block 512, the optical signal that bypasses the optical signal at block 508 is provided to a multiple-input photodiode of a photodiode circuit of the reconfigurable optical receiver. For example, the output of the optical demultiplexer 112 bypasses the optical processor 120 and is received by a multiple-input photodiode of the photodiode circuit 124. As another example, the output of the optical demultiplexer 312 bypasses the optical processor 120 and is received by a multiple-input photodiode of the photodiode circuit 124. As yet another example, the output of the optical demultiplexer 316 bypasses the optical processor 120 and is received by the multiple-input photodiode of the photodiode circuit 124.

On the other hand, in response to determining at block 504 that the type of modulation that the reconfigurable optical receiver is to process is the second type, the flow proceeds to block 516. At block 516, the optical switch of the reconfigurable optical receiver is controlled so that the optical signal corresponding to the signal received by the reconfigurable optical receiver is provided to the optical processor 120 of the reconfigurable optical receiver. For example, the optical switch 108 (FIG. 1A) is controlled so that optical signal 1 is provided to an input of the optical processor 120. As another example, the optical switch 304 (FIG. 3A) is controlled so that the optical signal in the first polarity direction is provided to a first input of the optical processor. As yet another example, the optical switch 308 (FIG. 3A) is controlled so that the optical signal in the second polarity direction is provided to a second input of the optical processor 120.

At block 520, multiple outputs of the optical processor are provided to the photodiode circuit of the reconfigurable optical receiver, including providing a first output of the optical processor 120 to the multiple-input photodiode. For example, outputs of the optical processor 1201 (FIGS. 1A, 3A) are provided to the photodiode circuit 124, including providing a first output of the optical processor 120 to the multiple-input photodiode of the photodiode circuit 124.

At block 524, a current signal output of the photodiode circuit is converted to a voltage signal using a TIA. For example, a current signal output by the photodiode circuit 124-1 is converted to a voltage signal by the TIA 128-1.

At block 528, the voltage signal generated at block 524 is sampled by an ADC to generate a digital domain signal. For example, the ADC 132-1 samples the voltage signal output by the TIA 128-1.

At block 532, a DSP processes the digital domain signal generated at block 532 to recover information bits from the digital domain signal. For example, the DSP 144 processes the digital domain signal generated by the ADC 132-1.

While the present invention has been described with reference to specific examples, which are intended to be illustrative only and not to be limiting of the invention, changes, additions and/or deletions may be made to the disclosed embodiments without departing from the scope of the invention.

What is claimed is:

1. An optical receiver apparatus for use with multiple optical modulation techniques, the optical receiver apparatus configured to convert one or more optical signals to an electrical signal, the optical receiver apparatus comprising:
    a photodiode circuit that is configured to process optical signals corresponding to multiple optical modulation techniques, including a first modulation technique and a second modulation technique different from the first modulation technique, the photodiode circuit including:
        a first photodiode configured to receive a first optical signal corresponding to a first modulation technique, and
        a multiple-input second photodiode coupled in series with the first photodiode, the multiple-input second photodiode being configured to receive i) a second optical signal corresponding to the first modulation technique, and ii) a third optical signal corresponding to the second modulation technique; and
    a transimpedance amplifier having an input coupled to the first photodiode and the second photodiode via a node between the first photodiode and the second photodiode, the transimpedance amplifier being configured to generate the electrical signal.

2. The optical receiver apparatus of claim 1, further comprising:
    a first waveguide optically coupled to the first photodiode, the first waveguide dedicated to guiding the first optical signal toward the first photodiode;
    a second waveguide optically coupled to the multiple-input second photodiode, the second waveguide dedicated to guiding the second optical signal toward the multiple-input second photodiode; and
    a third waveguide optically coupled to the multiple-input second photodiode, the third waveguide dedicated to guiding the third optical signal toward the multiple-input second photodiode.

3. The optical receiver apparatus of claim 2, further comprising:
    a fourth waveguide optically coupled to the multiple-input second photodiode, the fourth waveguide dedicated to guiding a fourth optical signal corresponding to the second modulation technique toward the multiple-input second photodiode.

4. The optical receiver apparatus of claim 1, wherein the multiple-input second photodiode comprises an active region having a size configured to accommodate receiving the second optical signal and receiving the third optical signal.

5. The optical receiver apparatus of claim 4, wherein the size of the active region is configured to accommodate also receiving a fourth optical signal corresponding to the second modulation technique.

6. The optical receiver apparatus of claim 1, wherein:
the first photodiode comprises a first anode and a first cathode;
the second photodiode comprises a second anode and a second cathode; and
the first anode is coupled to the second cathode via the node between the first photodiode and the second photodiode so that a first current flowing from the node toward the transimpedance amplifier corresponds to a second current flowing from the first anode minus a third current flowing into the second cathode.

7. The optical receiver apparatus of claim 6, wherein the node between the first photodiode and the second photodiode comprises circuitry having one or more transistors, the circuitry configured to perform at least one of i) amplifying and ii) buffering with regard to the first current.

8. The optical receiver apparatus of claim 1, further comprising:
an optical switch having an input that is optically coupled to an optical port;
an optical processor having i) an input coupled to a first output of the optical switch, ii) a first output that is optically coupled to the first photodiode, and iii) a second output that is optically coupled to the second photodiode; and
wherein a second output of the optical switch is optically coupled to the second photodiode in a manner that bypasses the optical processor.

9. The optical receiver apparatus of claim 8, further comprising:
an optical demultiplexer having i) an input optically coupled to the second output of the optical switch, and ii) an output optically coupled to the multiple-input second photodiode.

10. An optical receiver for use with multiple optical modulation techniques, the optical receiver comprising:
a plurality of photodiode circuits, each of at least one of the photodiode circuits being configured to process optical signals corresponding to multiple optical modulation techniques, including a first modulation technique and a second modulation technique different from the first modulation technique, the each of at least one of the photodiode circuits including:
a first photodiode configured to receive a first optical signal corresponding to a first modulation technique,
a multiple-input second photodiode coupled in series with the first photodiode, the multiple-input second photodiode being configured to receive i) a second optical signal corresponding to the first modulation technique, and ii) a third optical signal corresponding to the second modulation technique, and
a node between the first photodiode and the second photodiode;
a plurality of transimpedance amplifiers coupled to nodes of the plurality of photodiode circuits, each of at least some of transimpedance amplifiers having an input coupled to a respective node between the first photodiode and the multiple-input second photodiode of a respective photodiode circuit;
a plurality of analog-to-digital converters (ADCs) coupled to outputs of the plurality of transimpedance amplifiers; and a digital signal processor (DSP) coupled to outputs of the plurality of ADCs, the DSP configured to process outputs of the ADCs to decode bits modulated on optical signals received by the optical receiver.

11. The optical receiver of claim 10, further comprising:
an optical switch having an input that is optically coupled to an optical port corresponding to the optical receiver; and
an optical processor having i) an input coupled to a first output of the optical switch, ii) a first output that is optically coupled to a first photodiode of a first photodiode circuit among the plurality of photodiode circuits, and iii) a second output that is optically coupled to a multiple-input second photodiode of the first photodiode circuit;
wherein a second output of the optical switch is optically coupled to the multiple-input second photodiode of the first photodiode circuit in a manner that bypasses the optical processor.

12. The optical receiver of claim 11, wherein the optical processor comprises:
a coherent intradyne 90-degree hybrid device.

13. The optical receiver of claim 12, wherein the coherent intradyne 90-degree hybrid device comprises:
a coherent intradyne dual-polarization 90-degree hybrid device.

14. The optical receiver of claim 11, wherein the optical processor comprises:
a set of one or more delay line interferometers.

15. The optical receiver of claim 11, further comprising:
an optical demultiplexer having i) an input optically coupled to the second output of the optical switch and ii) an output that is optically coupled to the multiple-input second photodiode of the first photodiode circuit.

16. The optical receiver of claim 11, further comprising:
a first waveguide optically coupled to i) the first output of the optical processor and the first photodiode;
a second waveguide optically coupled to i) the second output of the optical processor and the multiple-input second photodiode; and
a third waveguide optically coupled to i) the second output of the optical switch and ii) the multiple-input second photodiode, the third waveguide bypassing the optical processor.

17. The optical receiver of claim 16, wherein the optical switch is a first optical switch, wherein the input of the optical processor is a first input, and wherein the optical receiver further comprises:
a second optical switch having a first output that is optically coupled to a second input of the optical processor; and
a fourth waveguide optically coupled to i) a second output of the second optical switch and ii) the multiple-input second photodiode, the fourth waveguide bypassing the optical processor.

18. The optical receiver of claim 10, wherein each multiple-input second photodiode comprises an active region having a size configured to accommodate receiving the second optical signal and receiving the third optical signal.

19. The optical receiver of claim 18, wherein the size of the active region of each multiple-input second photodiode is configured to accommodate also receiving a fourth optical signal corresponding to the second modulation technique.

20. A method of operating a reconfigurable optical receiver, the method comprising:
determining, at the reconfigurable optical receiver, a type of modulation that the reconfigurable optical receiver is to process, the type of modulation being determined from a plurality of different types of optical modulation techniques, including at least a first type and a second type;

in response to determining that the type of modulation that the reconfigurable optical receiver is to process is the first type,
- controlling an optical switch of the reconfigurable optical receiver so that an optical signal corresponding to a signal received by the reconfigurable optical receiver bypasses an optical processor of the reconfigurable optical receiver, and
- providing the optical signal that bypasses the optical processor to a multiple-input photodiode of a photodiode circuit of the reconfigurable optical receiver;

in response to determining that the type of modulation that the reconfigurable optical receiver is to process is the second type,
- controlling an optical switch of the reconfigurable optical receiver so that the optical signal corresponding to the signal received by the reconfigurable optical receiver is provided to an input of the optical processor of the reconfigurable optical receiver, and
- providing multiple outputs of the optical processor to the photodiode circuit of the reconfigurable optical receiver, including providing a first output of the optical processor to the multiple-input photodiode;

using a transimpedance amplifier of the reconfigurable optical receiver to convert a current signal output by the photodiode circuit to a voltage signal;

sampling, by an analog-to-digital converter (ADC) of the reconfigurable optical receiver, the voltage signal to generate a digital domain signal; and processing, by a digital signal processor (DSP) of the reconfigurable optical receiver, the digital domain signal to recover information bits from the digital domain signal.

21. The method of operating the reconfigurable optical receiver of claim 20, wherein:
- the photodiode circuit comprises a first photodiode;
- the multiple-input photodiode is a multiple-input second photodiode coupled in series with the first photodiode; and
- providing the multiple outputs of the optical processor to the photodiode circuit of further includes providing a second output of the optical processor to the first photodiode.

* * * * *